(12) United States Patent
Shinkawa

(10) Patent No.: US 6,304,474 B1
(45) Date of Patent: Oct. 16, 2001

(54) CHOPPER CIRCUIT, CHOPPER CIRCUIT CONTROL METHOD, CHOPPER-TYPE CHARGING CIRCUIT, ELECTRONIC DEVICE, AND TIMEKEEPING APPARATUS

(75) Inventor: Osamu Shinkawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/688,272

(22) Filed: Oct. 11, 2000

(30) Foreign Application Priority Data

Oct. 15, 1999 (JP) .................................................. 11-294427
Sep. 4, 2000 (JP) .................................................. 12-267547

(51) Int. Cl.[7] .......................... H02M 7/00; H02M 3/335; H02M 7/5387
(52) U.S. Cl. .............................. 363/124; 363/17; 363/132
(58) Field of Search .................................... 363/17, 56.02, 363/98, 131, 132, 124

(56) References Cited

U.S. PATENT DOCUMENTS

| 4,191,914 | * | 3/1980 | Lecluse | 318/139 |
| 4,238,821 | | 12/1980 | Walker | 363/58 |
| 4,447,867 | | 5/1984 | Evans et al. | 363/56 |
| 4,651,269 | | 3/1987 | Matsumura | 363/63 |
| 4,796,145 | | 1/1989 | Oshikiri | 361/57 |
| 5,432,420 | * | 7/1995 | Bahn | 318/701 |
| 5,510,972 | | 4/1996 | Wong | 363/127 |
| 5,825,248 | * | 10/1998 | Ozawa | 330/267 |
| 6,154,422 | * | 11/2000 | Shinkawa et al. | 368/208 |

FOREIGN PATENT DOCUMENTS

| 196 34 186 | 3/1997 | (DE) | G01B/31/26 |
| 0 862 262 | 9/1988 | (EP) | H02M/7/217 |
| 0 730 340 | 9/1996 | (EP) | H02M/7/515 |
| 53-123653 | 10/1978 | (JP) | H02M/1/08 |
| 9-131064 | 5/1997 | (JP) | H02M/7/219 |
| 10-282264 | 10/1998 | (JP) | G04C/10/00 |
| 11-187666 | 7/1999 | (JP) | H02M/7/219 |
| 97/24795 | 7/1997 | (WO) | H02M/7/217 |

* cited by examiner

*Primary Examiner*—Peter S. Wong
*Assistant Examiner*—Bao Q. Vu
(74) *Attorney, Agent, or Firm*—Mark P. Watson

(57) ABSTRACT

A controller for through current prevention circuit controlling two N-channel FETs sets a shorted period based on a clock signal and, when two P-channel FETs are off during the shorted period, sets the N-channel FETs to on, and when chattering occurs in the P-channel FETs forcibly sets the two N-channel FETs to the off state for a given amount of time.

36 Claims, 20 Drawing Sheets

CHOPPER CIRCUIT, CHOPPER CIRCUIT CONTROL METHOD, CHOPPER-TYPE CHARGING CIRCUIT, ELECTRONIC DEVICE, AND TIMEKEEPING APPARATUS

BACKGROUND OF THE INVENTION

1. Field of the Invention

The present invention relates to a chopper circuit, a chopper circuit control method, a chopper-type charging circuit, an electronic device, and a timekeeping apparatus.

2. Related Art

A chopper-type charging circuit is known as a charging circuit for charging a capacitor or a battery, with alternating current electrical power generated by an electrical generator.

FIG. 12 of the appended drawings is a circuit diagram of a chopper-type charging circuit. This chopper-type charging circuit 1 is formed by an oscillator circuit 2, which outputs a clock signal CL, and comparators COM1 and COM2, which perform a comparison between the voltages at output terminals A and B of an alternating current electrical generator AG and a terminal voltage VDD of a power supply, and an AND circuit 3, which calculates the logical product of the output signals SP1 and SP2 of the comparators COM1 and COM2 and the clock signal CL.

The chopper-type charging circuit also has a large-capacitance capacitor 4 for storing a charging current, and P-channel FETs P1 and P2, which are on/off controlled by the output signals SP1 and SP2 of the comparators COM1 and COM2, and N-channel FETs N1 and N2, which are on/off controlled by an output signal SN of the AND circuit 3.

In this configuration, diodes D1, D2, D3, and D4 are parasitic diodes of the P-channel FETs P1 and P2 and the N-channel FETs N1 and N2, respectively.

The operation of the chopper-type charging circuit is described below, with reference made to the timing diagram shown in FIG. 13.

In FIG. 13, the assumption is that until a time ta, the voltages at the output terminals A and B is no greater than the terminal voltage VDD, the comparator COM1 and COM2 output signals SP1 and SP2 being held at a high level, and the P-channel FETs P1 and P2 being in the off state.

At the time ta, when the clock signal CL changes to the high level, the output signal SN of the AND circuit 3 changes to the high level, so that the N-channel FETs N1 and N2 change to the on state, a closed loop being formed by the alternating current generator AG and the N-channel FETs N1 and N2.

In the above case, the alternating current generator AG generates an electromotive force and, for example, when the output terminal A reaches a positive potential with respect to the output terminal B, as shown by the symbol α in FIG. 12, a current i1 flows through a path from the alternating current generator AG, to the N-channel PET N1, and then to the N-channel FET N2.

At the time tb, when the clock signal CL falls to the low level, the output signal SN of the AND circuit 3 changes to the low level, so that the N-channel FETs N1 and N2 are placed in the off state, thereby cutting off the above-noted current path.

In the above case, because of the current that flows during the time when the clock signal CL is at the high level (hereinafter referred to as the shorted period), the energy is stored in the inductance of the generator coil of the alternating current generator AG, this energy causing a rise in the voltage at the output terminal A.

Next, at the time tc, when the voltage on the terminal A rises to above the terminal voltage VDD of the large-capacitance capacitor 4, the output signal SP1 of the comparator COM1 changes to the low level, so that the P-channel FET P1 switches to the on state.

As a result, as shown by the symbol β in FIG. 12, a current i2 flows through a current path from the diode D4 of the N-channel FET N2, to the alternating current generator AG, to the P-channel FET P1, and then to the large-capacitance capacitor 4. Thus, the charging of the large-capacitance capacitor 4 begins.

As the charging continues, energy stored in the inductance of the generator coil is gradually released, so that the charging current i2 gradually decreases. When the voltage on the output terminal A falls below the terminal voltage VDD of the large-capacitance capacitor 4, the output signal SP1 of the comparator COM1 changes to the high level, so that the P-channel FET P1 switches to the off state, thereby cutting off the above-noted charging current path.

That is, until the voltage at the output terminal A falls below the terminal voltage VDD of the large-capacitance capacitor 4, the AND circuit 3 holds the N-channel FETs N1 and N2 in the off state, so that charging is continued. Additionally, when the amount of electricity generated by the alternating current generator AG is large and the amount of energy stored in the inductance of the generator coil is large, charging continues even after switching to the shorted period, thereby making the charging time long, so that it commensurately eats away the shorted period.

In the case in which the electromotive force of the alternating current generator AG is generated and the output terminal B reaches a potential that is positive potential with respect to the output terminal A, the direction of the current i1 flowing during the above-noted shorted period reverses, so that the voltage on the output terminal B rises. As a result, the charging current i2 flows through the path from the diode D3 of the N-channel FET N1, and the alternating current generator AG, and the P-channel FET P2, and then the large-capacitance capacitor 4, resulting in the charging of the large-capacitance capacitor 4.

Thus, in a chopper-type charging circuit of the past, by repeatedly performing shorting and voltage rise of the circuit in accordance with the clock signal, the electromotive force of an alternating current generator, which has a small, non-uniform amount of generated electricity, is converted to a chopper voltage that charges a large-capacitance capacitor. In the case in which there is a large amount of energy stored in the inductance of the generator coil of the chopper-type charging circuit 1, or in which the input energy is large, the shorted period of the chopper is disabled, so that priority is given to charging by non-chopped operation. By performing charging by switching between chopper and non-chopped operation, it is possible to efficiently charge the large-capacitance capacitor.

In a chopper-type charging circuit using a unidirectional unit having a configuration in the voltage across the terminals of this type of field-effect transistor is comparator using a comparator, one method of that can be envisioned of improving the charging efficiency by reducing charging path loss is that of making the conduction resistance (on-state resistance) between the source and drain of the field-effect transistor as small a value as possible.

However, if this conduction resistance is made small, the source-drain voltage of the field-effect transistor is becomes small. Therefore, the potential at the collector input terminal falls below a threshold value, and the field-effect transistor goes into the off state, after which the difference in potential between the two input terminals of the comparator rises because of the forward voltage drop of the diode, resulting in the field-effect transistor immediately going into the on state, with this operation being repeated. In the case of such low-current conduction, a phenomenon known as chattering occurs, in which the field-effect transistor repeated alternates between the on and off states.

That is, at the time td in the timing diagram of FIG. 13, when the voltage on the output terminal A falls below the terminal voltage VDD of the large-capacitance capacitor 4, the output signal SP1 of the comparator COM1 changes to the high level, and the P-channel FET P1 goes into the off state. However, because the charging current i2 flowing in the P-channel FET P1 immediately before the switching of the output signal SP1 of the comparator COM1 to the high level (the region of time td) is small, the voltage drop due to the on resistance oft eh P-channel FET P1 is small. For this reason, when the signal SP1 changes to the high level and the P-channel FET P1 switches to the off state, because of the forward voltage drop of the diode D1, there is a rise in the potential difference between the two input terminals of the comparator COM1. Then, at time te, the output signal SP1 of the comparator COM1 falls to the low level for a short amount of time (FIG. 13).

That is, the potential difference between the input terminals of the comparator COM1 differ, depending upon whether the P-channel FET P1 is off or on, so that the signal level of the signal SP1 switching frequently between the high level and the low level. Therefore, chattering occurs in which the P-channel FET P1 repeatedly switches between the on state and the off state.

If this type of chattering phenomenon occurs when the clock signal CL is in its high level period (shorted period), such as shown in FIG. 13, the signal level of the output signal SN of the AND circuit 3 is switched in response to the switching of the signal level of the signal SP1.

When this occurs, as shown in FIG. 13 the timing of the switching of the signal level of the output signal SN of the AND circuit 3 is slightly retarded with respect to the timing of the switching of the signal level of the signal SP1, because of the delay time of the AND circuit 3.

For this reason, in the case in which chattering occurs during the shorted period, there occurs a period of time during which the both the P-channel FET P1 and both of the N-channel FETs N1 and N2 are in the on state (period dt shown in FIG. 13).

In this case, because the voltage at the output terminals A and B is equal to or smaller than the positive-side voltage VDD on the large-capacitance capacitor 4, a through current flows from the large-capacitance capacitor 4, as shown by the symbol γ in FIG. 13, so that the charging efficiency is reduced.

FIG. 14A is a waveform diagram of the current flowing in the chopper-type charging circuits 1, and FIG. 14B being an enlarged waveform diagram. It can be seen in these two waveform diagrams that the through current indicated above the ground reference center level is equal to or greater than the charging current indicated below the ground level reference.

For this reason, particularly in the case of a short charging time, the amount of discharge due to the through current is equal to or greater than the amount of charging obtained by the charging, resulting in a significant decrease in the charging efficiency.

SUMMARY OF THE INVENTION

The present invention provides a chopper circuit, a chopper circuit control method, a chopper-type charging circuit, and an electronic device or timekeeping apparatus incorporating these, capable of preventing a through current and improving the charging efficiency.

In accordance with an aspect of the present invention, there is provided a chopper circuit for generating a chopper voltage from electrical power of a power source, this chopper voltage being generated between a first line and a second line. This chopper circuit may have: a comparator for detecting an electromotive force, which compares a voltage of the first line with a voltage of an input terminal to which electrical power of the power source is supplied;

a switching section for charging provided between the first line and the input terminal, which, in the case in which a comparison result from the comparator is that the voltage of the input terminal is equal to or greater than a prescribed voltage, causes current to flow in one direction; a switching section for a closed loop, provided between the second line and the input terminal, having a switching element and a unidirectional element connected in parallel with the switching element, which causes current to flow in one direction; and a controller controlling the switching element of the switching section, wherein the controller has a closed-loop controller setting the shorted period based on a clock signal, which, in the case in which the switching section for charging is off during the shorted period, sets the switching section for a closed loop to on until the end of the shorted period, and a closed-loop inhibiting controller, which, in the case in which chattering occurs in the switching section for charging, forcibly sets the switching section for a closed loop to the off state for the given amount of time.

Preferably, the electrical power of the power source may be an electromotive force generated by an electrical generator.

It is preferable that the closed-loop controller has an off controller making a decision that chattering is occurring, based on detecting that the switching section for charging is changed from on to off in the shorted period, which, in the case in which chattering is decided to be occurring, forcibly sets the switching element of the switching section for the closed-loop to off; and an off reset section, which, at least before the next shorted period, resets the off state of the switching element of the switching section for the closed loop originally set by the off controller.

The closed-loop inhibiting section may further include a charging end determination section for determining the end of charging by detecting that the switching section for charging has been off for a given amount of time, wherein when a decision is made by the charging end determination section that the charging has ended, the off state of the switching element of the switching section for a closed loop, originally set by the off controller, is reset.

The closed-loop controller may have an off controller, which, when it makes a decision that chattering is occurring, based on detecting that the switching section for charging is changed from on to off, forcibly sets the switching element of the switching section for a closed loop to off; and a charging end detection section, which, when it decides that charging has ended by detecting that the switching section for charging has been off for a given amount of time, releases the off state of the switching element of the switching section for a closed loop that was originally set by the off controller.

In an embodiment, the chopper circuit may further include a second controller, provided between the second line and another input terminal that forms a pair with the input terminal, which, when the voltage of the other input terminal is equal to or greater than a prescribed voltage, sets the switching element of the switching section for a closed loop to on.

The chopper circuit may further have a second switching section for charging connected in parallel with the switching section for a closed loop, wherein the second switching section for charging switches a connection condition in response to a voltage on the other input terminal forming a pair with the input terminal.

The switching element for charging may have a switching element controlled based on a comparison result from the comparator for detecting an electromotive force, and a unidirectional element, connected in parallel with the switching element, which causes current to flow in one direction.

Advantageously, the switching element for charging may be a diode. In another aspect of the present invention, there is provided a chopper circuit for generating a chopper voltage from electrical power of an alternating current power source, the chopper voltage being generated between a first line and a second line. The chopper circuit may include: a first comparator for comparing the voltage of the first line with a voltage of one input terminal to which electrical power of the alternating current power source is supplied; a first switching section, provided between the first line and the one input terminal, which, in the case in which the voltage of the one input terminal is equal to or greater than a prescribed voltage, causes current to flow in one direction; a second comparator for comparing a voltage of the first line with another input terminal to which electrical power of the alternating current power source is supplied; a second switching section provided between the first line and the other input terminal, which, in the case in which the voltage on the other input terminal is equal to or greater than a prescribed voltage, causes current to flow in one direction; a third switching section provided between the second line and the one input terminal, having a switching element and a unidirectional element connected in parallel with the switching element, which causes current to flow in one direction; a fourth switching section provided between the second line and the other input terminal, having a switching element and a unidirectional element connected in parallel with the switching element, which causes current to flow in one direction; and a controller controlling the switching elements in the third and fourth switching sections, wherein the controller has a closed-loop controller setting the shorted period based on a clock signal, which, in the case in which the first and second switching sections are off during the shorted period, sets the switching elements of the third and fourth switching section to on until the shorted period ends, and a closed-loop inhibiting section, which, in the case in which chattering occurs in the first and second switching sections, forcibly sets the switching elements of the third and fourth switching section to off for a given amount of time.

In this aspect, electromotive force of the power source may be an electromotive force generated by an electrical generator.

Preferably, the closed-loop inhibiting section may have an off controller making a decision that chattering is occurring, based on detecting that the switching section for charging is changed from on to off in the shorted period, which, in the case in which chattering is decided to be occurring, forcibly sets the switching elements of the third and fourth switching section to off; and an off reset section, which, at least before the next shorted period, resets the off state of the switching elements of the third and fourth switching section originally set by the off controller.

Advantageously, the closed-loop inhibiting section may further include a charging end determination section for determining the end of charging by detecting that the first and second switching sections have been off for a given amount of time, wherein when a decision is made by the charging end determination section that the charging has ended, the off state of the switching elements of the third and fourth switching sections, originally set by the off controller, are reset.

The closed-loop inhibiting section may include an off controller, which, when it makes a decision that chattering is occurring, based on detecting that the first or second switching section is changed from on to off, forcibly sets the switching elements of the third and fourth switching sections to off; and a charging end detection section, which, when it decides that charging has ended by detecting that the first and second switching sections have been off for a given amount of time, releases the off state of the switching elements of the third and fourth switching sections that was originally set by the off controller.

The first switching section may have a switching element controlled base on a comparison result of the first comparator, and a unidirectional element, connected in parallel with the switching section, which causes current to flow in one direction. The second switching section may have a switching element controlled base on a comparison result of the econd comparator, and a unidirectional element, connected in parallel with the switching section, which causes current to flow in one direction.

Preferably, the first and second switching sections may be diodes.

The first line may be a high-voltage side line while the second line may be a low-voltage side line.

The switching elements may preferably be field-effect transistors while the unidirectional elements may be parasitic diodes of the field-effect transistors.

In accordance with still another aspect of the present invention, there is provided a method for controlling a chopper circuit. The chopper circuit may include a comparator circuit for detecting an electromotive force, which compares a voltage of a first line with a voltage of an input terminal to which electrical power of a power source is supplied; a switching circuit for charging provided between the first line and the input terminal, which, in a case in which the voltage of the input terminal is equal to or greater than a prescribed voltage, causes current to flow in one direction; a switching circuit for a closed loop, provided between a second line and the input terminal, comprising a switching element and a unidirectional element connected in parallel with the switching element, which causes current to flow in one direction; and a control circuit controlling the switching element of the switching circuit, wherein a chopper voltage is generated from electrical power of the power source, the chopper voltage being generated between the first line and the second line. The method may include setting, by the control circuit, a shorted period based on a clock signal; deactivating, by the control circuit, the switching element of the switching circuit for the closed loop to off until the shorted period ends if switching circuit for charging is turned off during the shorted period; and deactivating the switching element of the switching circuit for the closed loop into the off state for a given amount of time if chattering occurs in the switching circuit for charging.

Preferably, when it is decided that chattering occurs by detecting that the switching circuit for charging is changed from on to off in the shorted period, the control circuit forcibly may set the switching element of the switching circuit for a closed-loop to off. At least before the next shorted period, the control circuit may release the off state of the switching element of the switching circuit for a closed loop.

The control circuit may decide that charging has ended by detecting that the switching circuit for charging has been off for a given amount of time. When a decision is made that charging has ended, the control circuit may release the off state of the switching element of the switching circuit for a closed loop.

The control circuit may forcibly activate the switching circuit for the closed loop to the off state when it is decided that chattering occurs by detecting that the switching circuit for charging is changed from on to off. When it is decided that charging has ended, by detection that the switching circuit for charging is off for a given amount of time, the control circuit may release the off state of the switching circuit for a closed loop.

In accordance with a further aspect of the present invention, there is provided a method for control of a chopper circuit. The chopper circuit may include a first comparator circuit comparing a voltage of a first line with a voltage of one input terminal to which electrical power of an alternating current power source is supplied; a first switching circuit provided between the first line and the one input terminal, which, in a case in which the voltage of the one input terminal is equal to or greater than a prescribed voltage, causes current to flow in one direction; a second comparator circuit comparing a voltage of a first line with a voltage of another input terminal to which electrical power of the alternating current power source is supplied; a second switching circuit provided between the first line and the another input terminal, which, in a case in which the voltage of the another input terminal is equal to or greater than a prescribed voltage, causes current to flow in one direction; a third switching circuit provided between the second line and the one input terminal, having a switching element and a unidirectional element connected in parallel with the switching element, which causes current to flow in one direction; a fourth switching circuit provided between the second line and the another input terminal, having a switching element and a unidirectional element connected in parallel with the switching element, which causes current to flow in one direction; and a control circuit controlling the switching elements of the third and the fourth switching circuits, wherein a chopper voltage is generated from electromotive force of the alternating current power source, the chopper voltage being generated between the first line and the second line. The method may comprise: setting, by the control circuit, a shorted period based on a clock signal; activating, by the control circuit, the switching elements of the third and the fourth switching circuits to the on state until the shorted period ends if the first and the second switching circuits are turned off during the shorted period; and deactivating forcibly, by the control circuit, the switching elements of the third and fourth switching circuits into the off state if chattering occurs in the first and the second switching circuits.

Preferably, when the decision is made that chattering occurs, by detecting of the switching circuit for charging being changed from on to off in the shorted period, the control circuit may forcibly set the switching elements of the third and fourth switching circuits to off. Additionally, at least before the next shorted period, the control circuit may release the off state of the switching elements of the third and fourth switching circuits.

In the method, the control circuit may also decide that charging has ended by detecting that the first and second switching circuits have been off for a given amount of time. When the end of charging is decided, the control circuit may release the off state of the switching elements of the third and fourth switching circuits.

The control circuit may further decide that chattering occurs by detecting that the first or second switching circuit changes from on to off. If decision is made that chattering is occurring, the control circuit may forcibly set the switching elements of the third and fourth switching circuits to off. This control circuit may further decide that charging has ended by detecting that the first and second switching circuits have remained in off state for prescribed time. If decision is made that charging has ended, the control circuit may release the off state of the switching elements of the third and fourth switching circuits.

In accordance with yet another aspect of the present invention, a chopper-type charging circuit may include the above-mentioned chopper circuit and a storage section storing a chopper voltage of the chopper circuit.

In accordance with a further aspect of the present invention, an electronic device may internally incorporate either of the aforementioned chopper-type charging circuits, driven by electrical power supplied from the chopper-type charging circuit.

In accordance with another aspect of the present invention, a timekeeping apparatus may include either of the aforementioned chopper-type charging circuits, and a time display section displaying a time kept by electrical power supplied from the chopper-type charging circuit.

In accordance with still another aspect of the invention, a chopper-type charging circuit may include the above-mentioned chopper circuit, and a storage battery that stores a chopper voltage of the chopper circuit.

BRIEF DESCRIPTION OF THE DRAWINGS

The above and other features of the present invention will be better understood by reading the description of exemplary embodiments that follows, in conjunction with the accompanying drawings, of which.

DETAILED DESCRIPTION OF THE PREFERRED EMBODIMENTS

A wristwatch to which a chopper-type charging circuit is applied is described below as an embodiment of the present invention.

Figure 1:
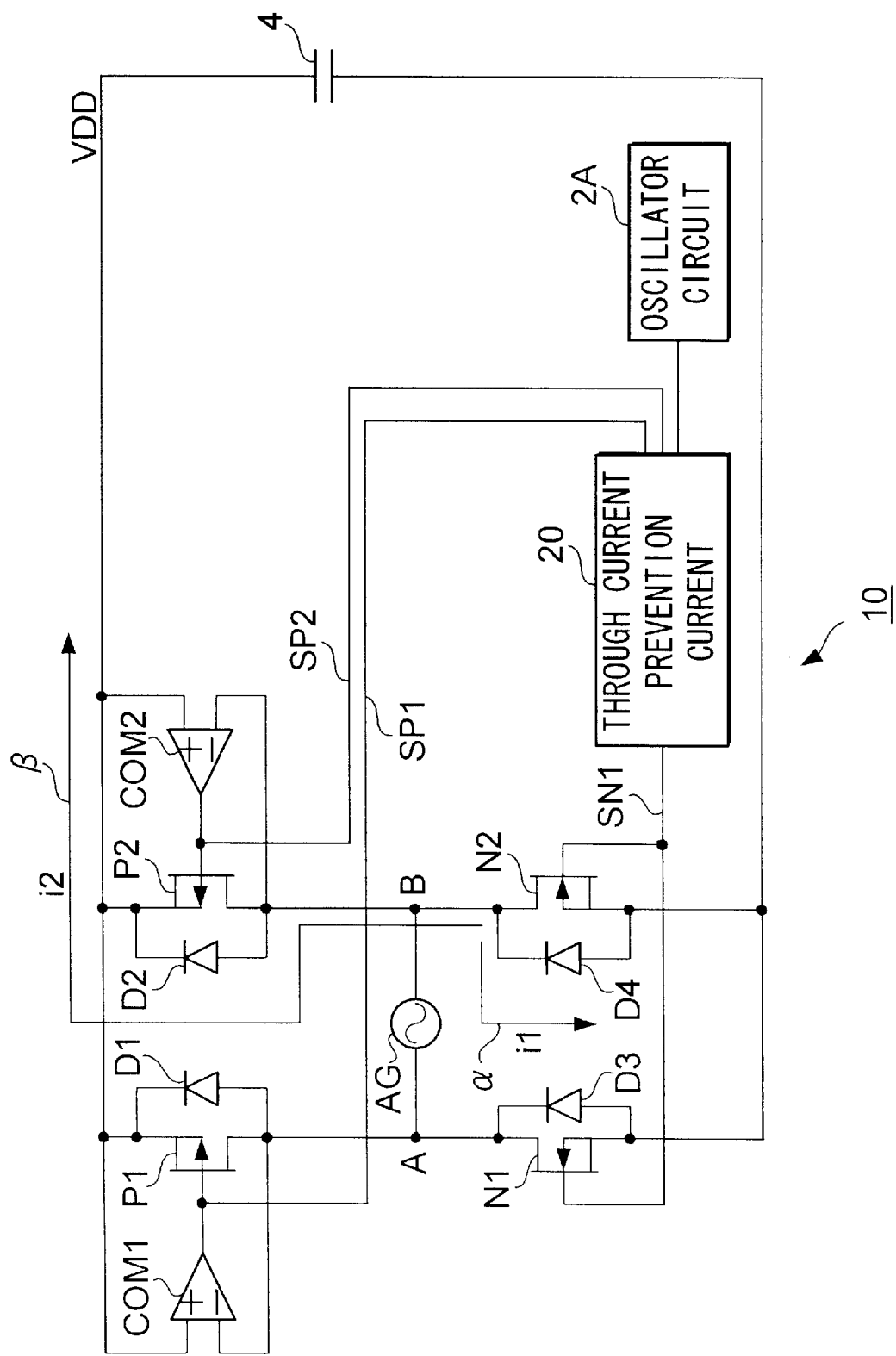
FIG. 1 is a circuit diagram of a chopper-type charging circuit used in a wristwatch according to a first embodiment of the present invention.

FIG. 1 is a circuit diagram of a chopper-type charging circuit used in a wristwatch according to the present invention. In this chopper-type charging circuit 10, aside from the fact that a through current prevention circuit 20 is used in place of the AND circuit 3 shown in FIG. 3, the configuration is almost the same as that the chopper-type charging circuit 1 of the past, and corresponding elements have been assigned the same reference numerals, and a detailed description of these elements will not be presented.

The chopper-type charging circuit 10 is formed by an oscillator circuit 2A, which outputs a clock signal, comparators COM1 and COM2 (comparators for detection of electromotive force), which perform a comparison between the voltages at output terminals A and B and a terminal voltage VDD, a P-channel FET P1 (switch for charging) that is on/off controlled by the output signal SP1 of the comparator COM1, and a P-channel FET P2 (switch for charging) that is on/off controlled by the outputs signal SP2 of the comparator COM2.

The chopper-type charging circuit 10 also has N-channel FETs N1 and N2 (switches for a closed loop), which are connected to the output terminals A and B of an alternating current generator AG, a through current prevention circuit (controller) 20, which controls on/off of the N-channel FETs N1 and N2, and a large-capacitance capacitor 4 (storage section) for storing a charging current.

Although the diodes D1, D2, D3, and D4 (unidirectional elements) in this case are parasitic diodes of the P-channel FETs P1 and P2 and the N-channel FETs N1 and N2, it will be understood that they can alternately be normal diodes.

Figure 2:
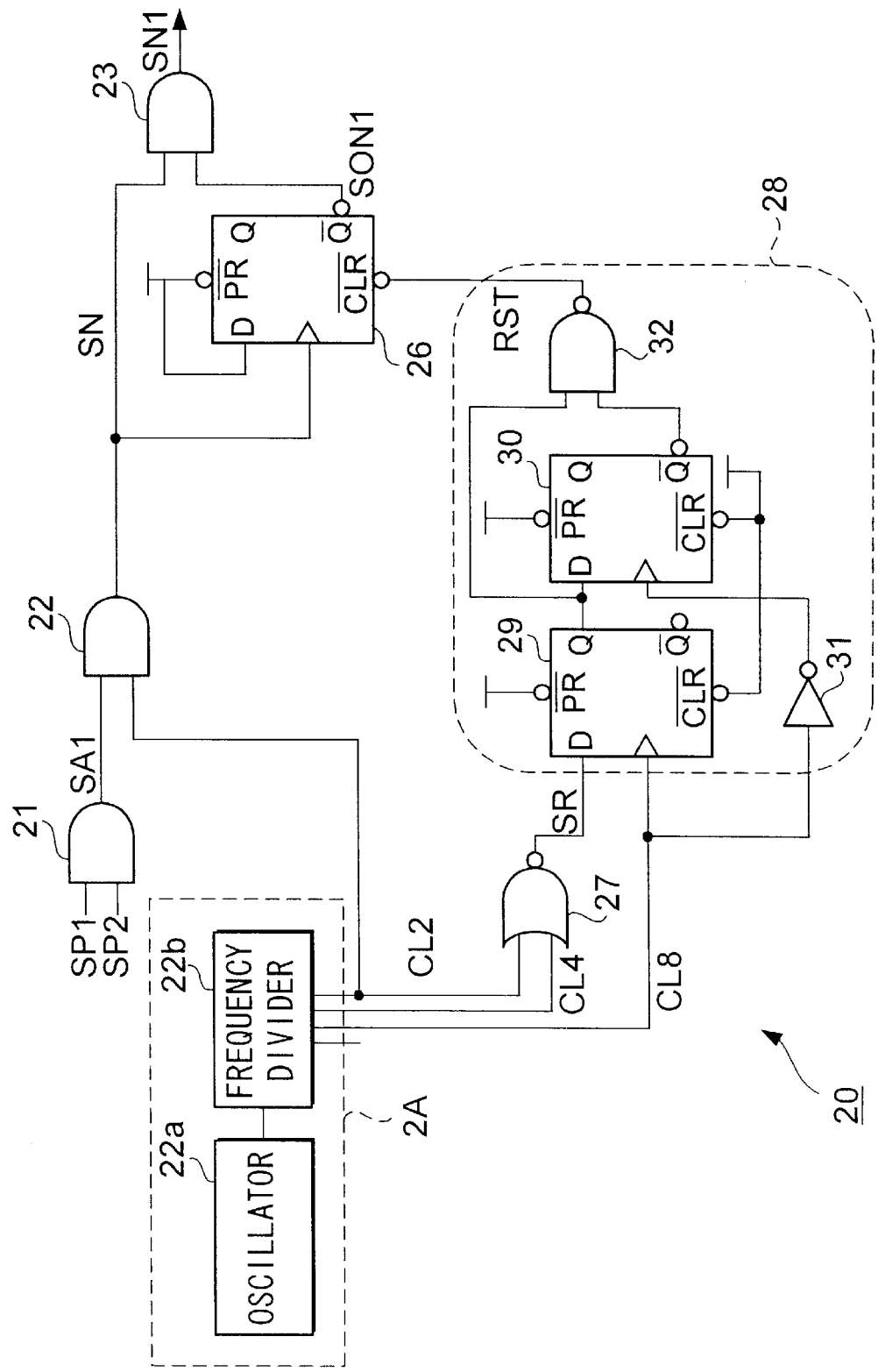
FIG. 2 is a circuit diagram of a through current prevention circuit and peripheral circuitry of the chopper-type charging circuit shown in FIG. 1.

FIG. 2 is a circuit diagram of the through current prevention circuit 20 and the peripheral circuitry.

In FIG. 2 the oscillator circuit 2A has an oscillator circuit 22a having a quartz resonating element and a frequency division circuit 22b. The frequency division circuit 22b divides a clock signal of, for example, 32 kHz, that is output from the oscillator circuit 22a into a plurality of frequencies, which are supplied to the through current prevention circuit 20.

The oscillator circuit 2A in this case minimally outputs clock signal CL2, CL4, and CL8 of frequencies 2 kHz, 4 kHz, and 8 kHz. The 2-kHz clock signal CL2 is a reference clock for the purpose of setting the shorted period of the chopper-type charging circuit 10. The period of time in over which the 2-kHz clock CL2 is at the high level is set as the shorted period, and the period of time over which the 2-kHz clock CL2 is at the low level is set as the charging (open) period. The 4-kHz and 8-kHz clocks CL4 and CL8, respectively, are signals for the purpose of generating a signal RST, to be described below, in the through current prevention circuit 20.

The through current prevention circuit 20 is formed by three AND circuits 21, 22, and 23, a D-type flip-flop circuit 26, a NOR circuit 27, and an edge detection circuit 28.

The AND circuit 21 calculates the logical product of the output signal SP1 of the comparator COM1 and the output signal SP2 of the comparator COM2. The output signal SA1 of the AND circuit 21 is supplied to one input terminal of the AND circuit 22. For this reason, when both the output signals SP1 and SP2 are at the high level, that is, when both the P-channel FETs P1 and P2 are in the off state, the signal SA1 is at the high level.

The AND circuit 22 calculates the logical product of the signal SA1 and the 2-kHz clock signal CL2. The output signal of the AND circuit 22 is supplied to one input terminal of the AND circuit 23 and, to the clock input terminal of the D-type flip-flop circuit 26. For this reason, when the 2-kHz clock signal CL2 is at the high level (that is, during the shorted period) and both the P-channel FETs P1 and P2 are in the off state, the output signal of the AND circuit 22 is at the high level.

In this case, because the output signal of the AND circuit 22 is the same type of signal as the output signal SN of the above described AND circuit 23, this will be referred to as the SN signal in the description to follow.

The D-type flip-flop circuit 26 (off controller and closed-loop inhibiting controller) latches the high-level signal supplied to the D input terminal when the signal SN supplied to the clock input terminal thereof rises, causing a low-level output at the inverted Q output terminal. The D-type flip-flop circuit 26 is cleared when the signal RST supplied to the clear terminal CLR changes to the low level.

The signal at the inverted Q output terminal of the D-type flip-flop circuit 26 is supplied as the on-inhibit signal SON1 to the other input terminal of the AND circuit 23.

The on-inhibit signal SON1 functions as an open/close signal for the AND circuit 23. In the case in which the on-inhibit signal SON1 is at the high level, the signal SN supplied to the other input terminal of the AND circuit 23 is supplied as the signal SN1 to the gates of the N-channel FETs N1 and N2. If the on-inhibit signal SON1 is a the low level, however, because the signal SN supplied to the other input terminal of the AND circuit 23 is not supplied to the gates of the N-channel FETs N1 and N2, the N-channel FETs N1 and N2 are maintained in the off state.

The NOR circuit 27 calculates the inverted logical sum (NOR) of the 2-kHz clock signal CL2 and the 4-kHz clock signal CL4. The output signal SR of the NOR circuit 27 is supplied to the edge detection circuit 28.

The edge detection circuit 28 (off reset section and closed-loop inhibiting controller) is formed by two D-type flip-flop circuits 29 and 30, an inverter 31, and a NAND circuit 32.

When the 8-kHz clock signal CL8 supplied to the clock input terminal of the D-type flip-flop circuit 29 rises, the signal SR supplied to the D input terminal thereof is latched, and the signal level of the signal SR is output at the Q output terminal.

When the 8-kHz clock signal CL8 supplied to the clock input terminal of the D-type flip-flop circuit 30 falls, the signal level at the Q output terminal of the D-type flip-flop circuit 29 supplied to the D input is latched, and the latched signal level is output in inverted form at he inverted Q output terminal.

The output signal of the Q output terminal of the D-type flip-flop circuit 29 and the output signal of the inverted Q output terminal of the D-type flip-flop circuit 30 are supplied to the input terminals of the NAND circuit 32, so that the inverted logical product (NAND) of these two signals is calculated. The output signal RST of the NAND circuit 32 is supplied to the clear terminal of the D-type flip-flop circuit 26.

More specifically, in the edge detection circuit 28 the signal level of the signal SR when the 8-kHz clock signal CL8 signal rises is supplied to one input terminal of the NAND circuit 32 from the output terminal Q of the D-type flip-flop circuit 29. When the clock signal CL8 falls the next time, a signal level that is the inversion of the signal level of the signal output from the output terminal Q of the D-type flip-flop circuit 29 is supplied from the inverted output terminal Q of the D-type flip-flop circuit 30 to the other input terminal of the NAND circuit 32.

Stated differently, the signal level of the signal SR when the clock CL8 rises is supplied to one input terminal of the NAND circuit 32. To the other input terminal of the NAND circuit 32 is supplied a signal level that is the inversion of the signal level of the signal SR when the clock signal CL8 rose the last time.

Therefore, in the case in which the signal level of the signal SR changes to the high level, the output signal RST of the edge detection circuit 28 is at the low level from the point at which the clock signal CL8 rises until the time at which it falls.

In contrast to this, after the signal RST transitions from the low level to the high level, in the case in which the signal level of the signal SR is constant and the case in which the signal SR signal level changes to the low level, the output signal RST of the edge detection circuit 28 is maintained at the high level.

The result of the above is that, in the case in which the signal level of the signal SR changes to the high level, the output signal RST of the edge detection circuit 28 clears the D-type flip-flop circuit 26.

The configuration of the alternating current generator AG and the peripheral mechanism is as follows.

Figure 3:
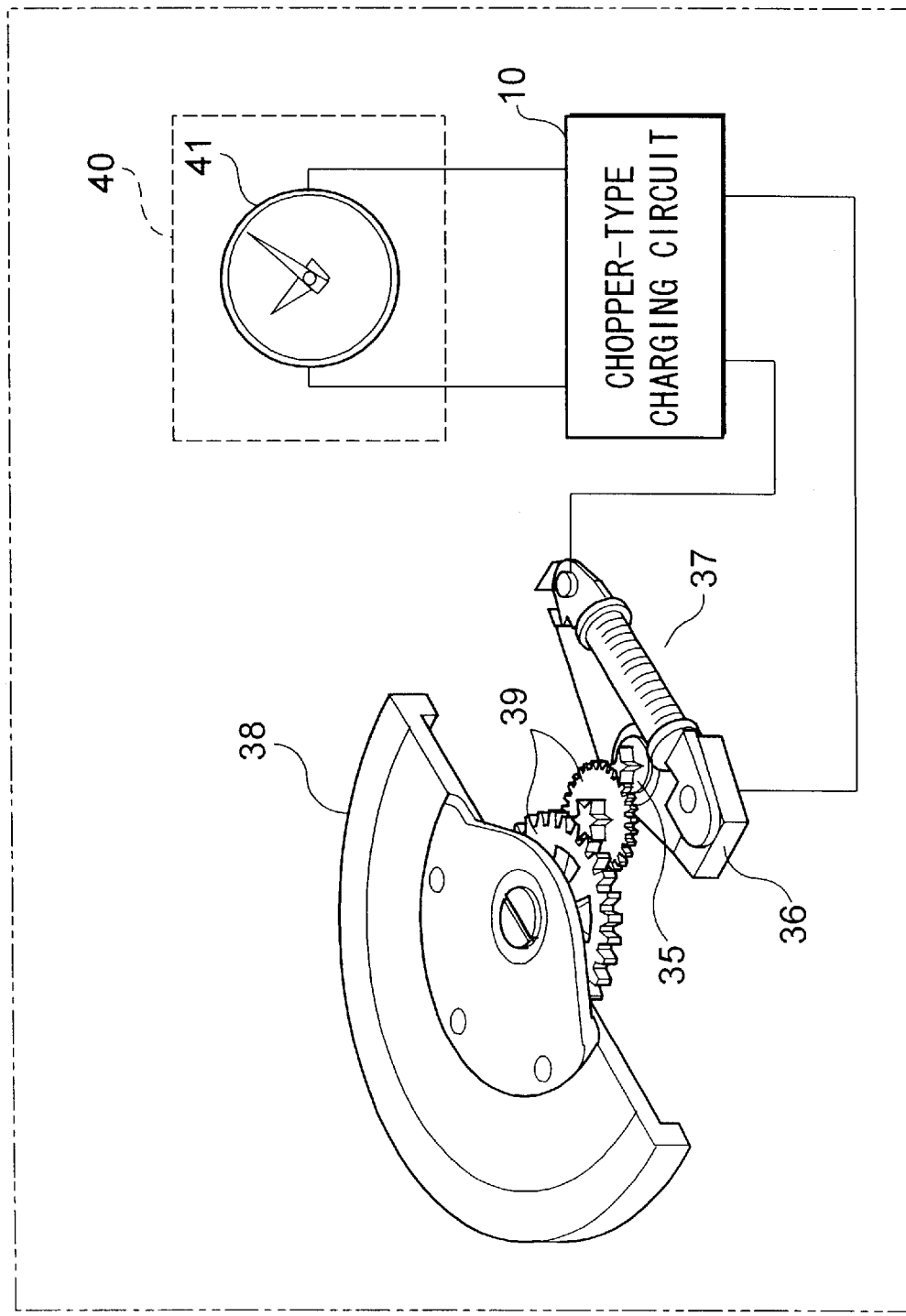
FIG. 3 is a perspective view showing the configuration of an alternating current generator of the wristwatch shown in FIG. 1 and the peripheral mechanism.

FIG. 3 is a peripheral view of the alternating current generator AG and the associated peripheral mechanism. As shown in FIG. 3, the alternating current generator AG has a rotor 35 and a stator 36 and, when the two-pole disc-shaped rotor 35 rotates, an electromotive force is generated in the generator coil 37 of the stator 36, so that an alternating current can be extracted therefrom as an output. In FIG. 3, the reference numeral 38 denotes a rotating flywheel, and 39 is a gear train mechanism that transmits rotational movement of the rotating flywheel 38 to the alternating current generator AG. The flywheel 38 rotates in response swinging of the arm of the wearer of the wristwatch, so that an electromotive force is obtained from the alternating current generator AG.

The term alternating current generator AG as used herein refers to a device that generates electricity by the rotation of a rotor by manual rotation of a stem, and an alternating current that generates electricity by rotation of a rotor by the winding and release of a coil spring. Thus, such alternating current generators are widely used.

The alternating current output from the alternating current generator AG is rectified by the chopper-type charging circuit 10 of this embodiment, and supplied to the processing apparatus 40 (time display section). The processing apparatus 40 drives the timekeeping apparatus 41 (time display section) by means of the electrical power supplied from the chopper-type charging circuit 10. The timekeeping apparatus 41 (time display section) performs timekeeping operation based on the clock signal CL1 output form the oscillator circuit 2A.

As described above, the oscillator circuit 2A that generates the clock signal CL1 used by both the chopper-type charging circuit 10 and the timekeeping apparatus 41. As a result, in addition to simplifying the overall circuit configuration of the wristwatch, it is possible to reduce the overall current consumption of the wristwatch.

It will be readily understood that method of display the time in the timekeeping apparatus 41 can be either display by hands or digital display with numerals.

Figure 15:
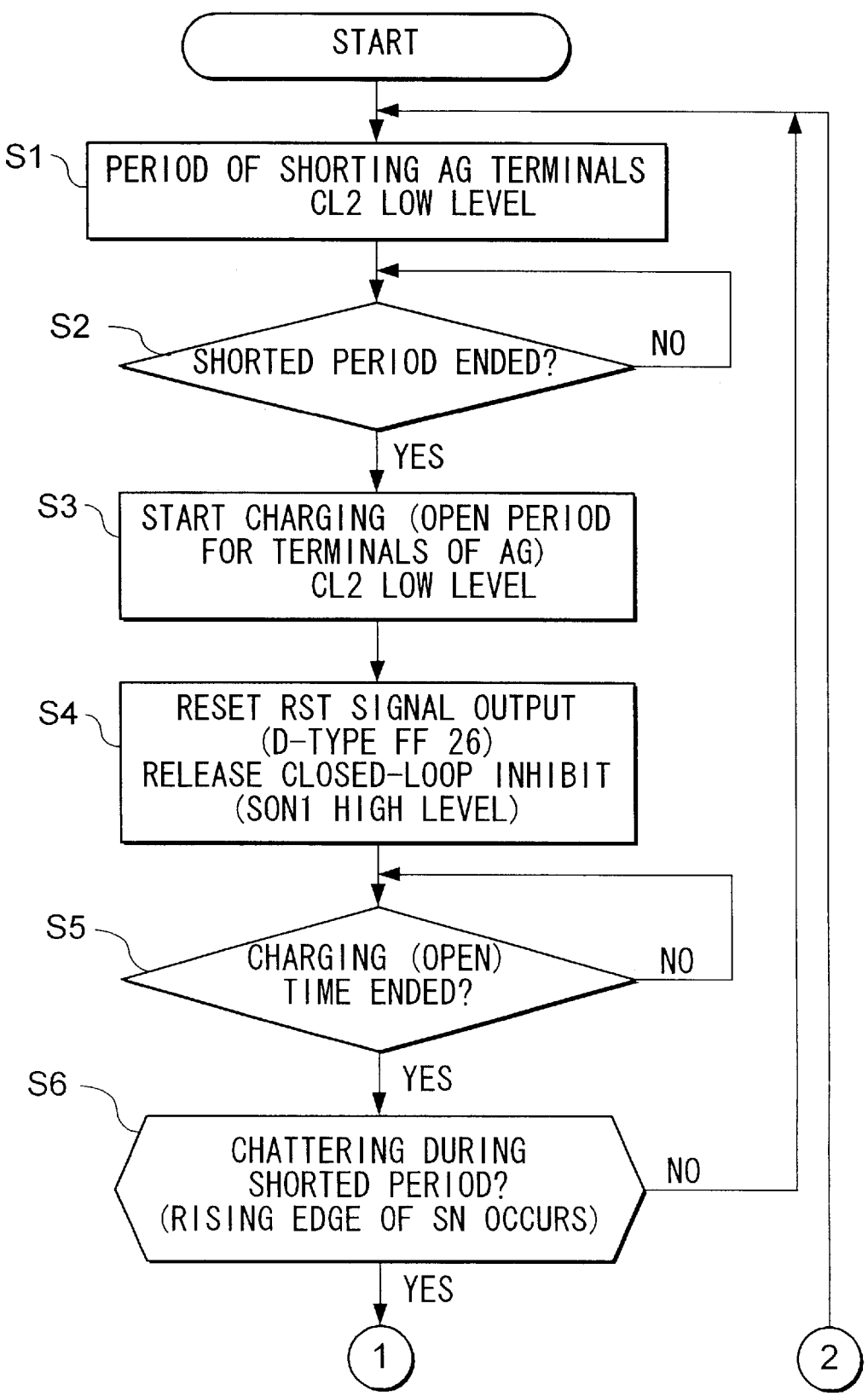
FIGS. 15 and 16 form a flowchart showing an example of operation of a chopper-type charging circuit used in a wristwatch according to the first embodiment of the present invention.
Figure 16:
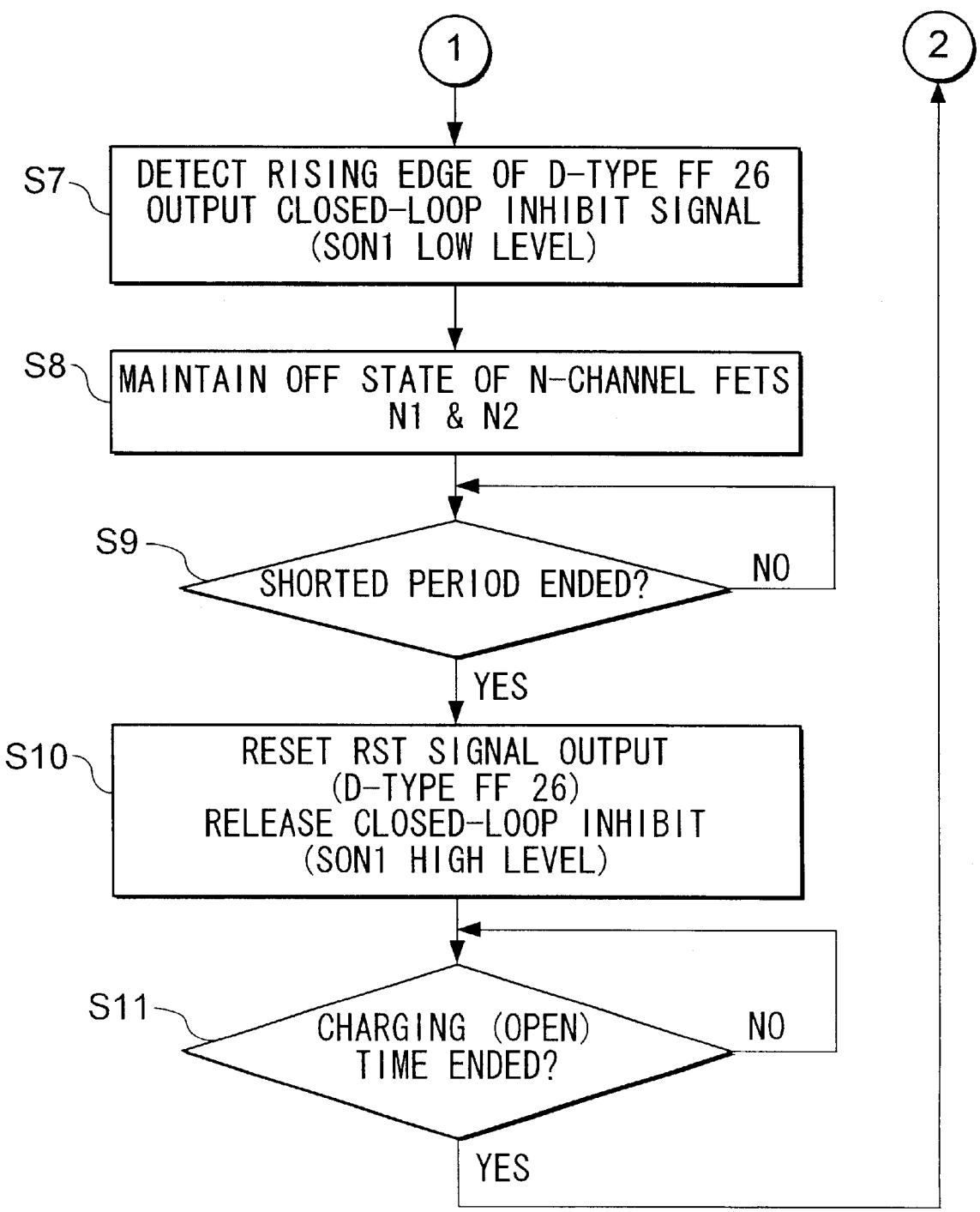

The operation of the first embodiment of the present invention is described in detail below, with reference made to the flowchart of FIG. 15 and FIG. 16, and the timing diagram of FIG. 4. In this case, the wristwatch is worn on the wrist, and electromotive force is intermittently generated by the alternating current generator AG.

Figure 4:
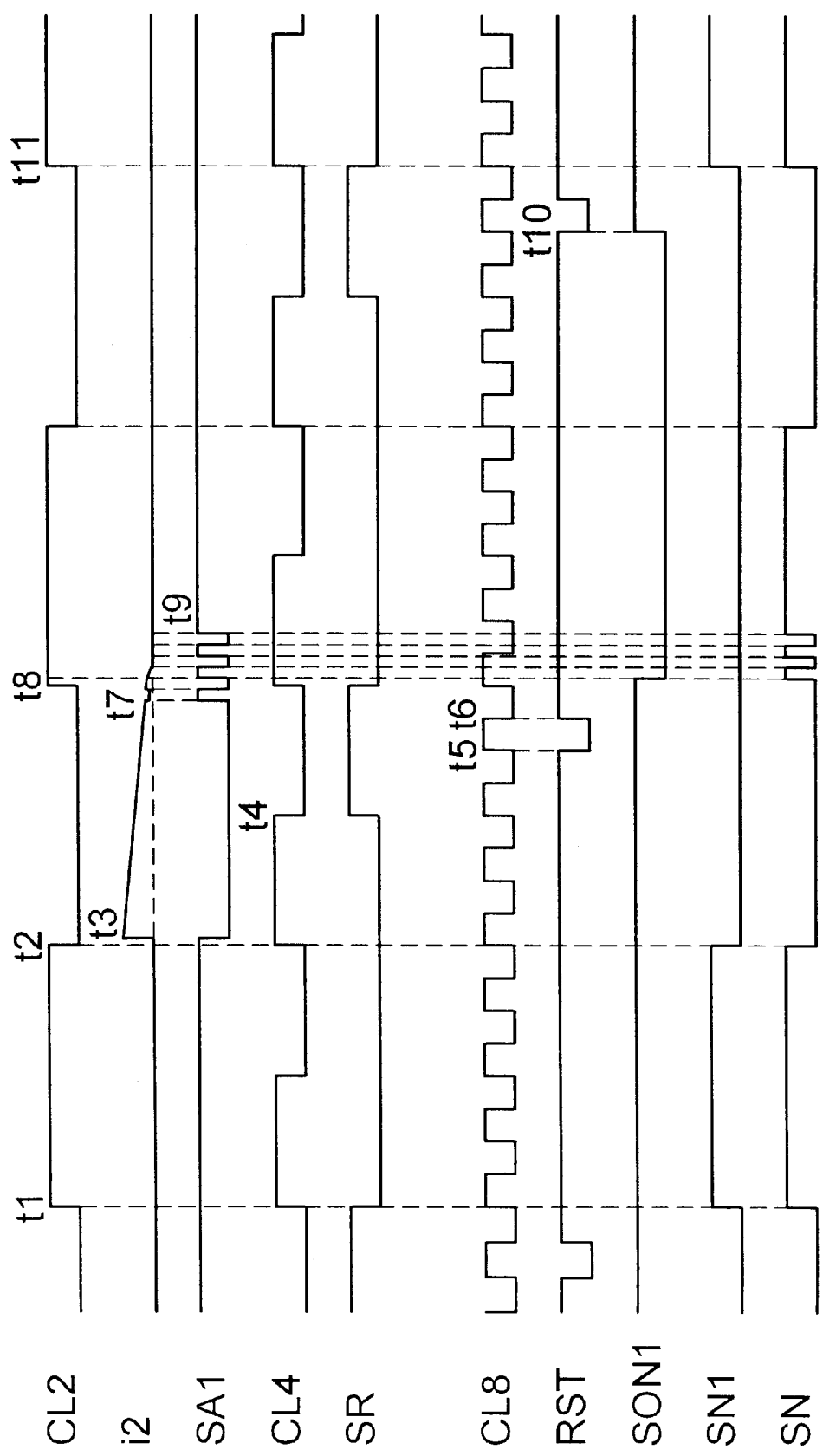
FIG. 4 is a timing diagram showing the chopper-type charging circuit of FIG. 1.

FIG. 4 is a timing diagram of the chopper-type charging circuit 10 according to this embodiment. In this case, the assumption is that at the time t1, the output signal SP1 of the comparator COM1 and the output signal SP2 of the comparator COM2 are at the high level, and that the P-channel FETs P1 and P2 are in the off state, that is, the input terminals A and B of the alternating current AG are at voltages that are below the terminal voltage VDD.

As shown in FIG. 4, at time t1 the 2-kHz clock signal CL2 output from the frequency division circuit 22b changes to the high level, causing transition from the charging (open) time to the shorted period (step S1). As shown in FIG. 4, the output signal SN of the AND circuit 22 changes to the high level.

As shown in FIG. 4, the 2-kHz, 4-kHz, and 8-kHz clock signals CL2, CL4, and CL8 are uniformly generated at the rising edge of the frequency division circuit 22b. For this reason, as shown in FIG. 4, the output signal SR of the NOR circuit 27 changes to the low level at the time t1.

In the case in which the signal SR is at the low level, as shown in FIG. 4, the output signal RST of the edge detection circuit 28 is maintained at the high level. Therefore, the on-inhibit signal SON1, as shown in FIG. 4, is maintained at the high level.

The effect of the above is that the signal SN is supplied as the signal SN1 to the gates of the N-channel FETs N1 and N2, via the AND circuit 23. Therefore, as shown in FIG. 4, when the signal SN1 changes to the high level at time t1, the N-channel FETs N1 and N2 are switched to the on state.

As a result, shown by the symbol α in FIG. 1, a closed loop is formed by the alternating current generator AG and the N-channel FETs N1 and N2 in the chopper-type charging circuit 10. A current i1 responsive to the electromotive force of the alternating current generator AG flows in this closed loop, resulting in storage of energy in the inductance of the generator coil 37. The closed loop can be formed by shorting both ends of the generator coil 37, or via a diode or resistance or the like.

Next, as shown in FIG. 4, when the 2-kHz clock signal CL2 changes to the low level at time t2, the shorted period ends. Then, as shown in FIG. 4, the signal SN changes to the low level. Therefore, as shown in FIG. 4, the signal SN1 changes to the low level, and the N-channel FETs N1 and N2 are switched to the off state.

At the transition of the shorted period to the charging (open) time (YES result at step S2), the energy stored in the inductance of the generator coil 37 causes the voltage on the output terminal A to rise. At the time t3, when the voltage on the output terminal A reaches the terminal voltage VDD, the output signal SP1 of the comparator COM1 changes to the low level, and the P-channel FET P1 changes to the on state.

As a result, a current path to the large-capacitance capacitor 4 is formed and, as shown by the symbol β in FIG. 1, a charging current i2 flows in the large-capacitance capacitor 4, so that the charging of the large-capacitance capacitor 4 begins (step S3).

While the description above is for the case in which the voltage at terminal A rises, because the operation of the comparator COM2 and the P-channel FET P2 would be the same in the case in which the voltage at the terminal B rises as the operation of the comparator COM1 and the P-channel FET P1 in the described case, this will not be explicitly described.

Next, at time t4 shown in FIG. 4, because the 4-kHz clock signal CL4 changes to the low level, the signal SR changes to the high level, as shown in FIG. 4.

In this case, when the edge detection circuit 28 detects the rising edge of the 8-kHz clock signal CL8 at the time t5, the output signal RST of the edge detection circuit 28 changes to the low level, as shown in FIG. 4. Then, when the edge detection circuit 28 detects the falling edge of the 8-kHz clock signal CL8 at the time t6, the output signal RST of the edge detection circuit 28 changes to the high level.

When the output signal RST of the edge detection circuit 28 changes to the low level, the D-type flip-flop circuit 26 is cleared, resulting in the on-inhibit signal SON1 changing to the high level (step S4).

That is, when the 2-kHz and 4-kHz clock signals CL2 and CL4 change to the low level, the D-type flip-flop circuit 26 is cleared after a prescribed amount of time, so that the on-inhibit signal SON1 changes to the high level. By doing this, the on-inhibit signal SON1 is always output as a high level signal immediately before the 2-kHz clock signal CL2 changes to the high level, that is, before a transition to the shorted period.

In FIG. 4, the D-type flip-flop circuit 26 is cleared at the time t5. As shown in FIG. 4, because the on-inhibit signal SON1 is at the high level at the time t5, it is maintained at the high level.

The potential on the output terminal A gradually decreases as a result of charging and, when the voltage on the output terminal A falls below the terminal voltage VDD at time t7, the output signal SP1 of the comparator COM1 changes to the high level, resulting in the P-channel FET P1 switching to the off state.

In the above case, the because both the signal SP1 and the signal SP2 are at the high level, the signal SA1 changes to the high level, as shown in FIG. 4.

In order to reduce the resistance in the charging path and improve the charging efficiency, in general P-channel FETs P1 and P2 are used which have a relatively low source-to-drain conduction resistance (on-state resistance).

For this reason, during the charging period when the voltage at the output terminal A approaches the terminal voltage VDD and the P-channel FET P1 switches from the on state to the off state, because of the forward voltage drop of the diode D1, the voltage across the two terminals of the comparator COM1 rises, so that the operation of the P-channel FET P1 switching again to the on state is repeated. That is, the phenomenon called chattering, which is repeated on/off switching, occurs in the P-channel FET P1 at around the last part of charging (in the time period between t7 and t9 in FIG. 4).

For this reason, when at time t8 the 2-kHz clock signal CL2 changes to the high level, there is a transition from the charging (open) time to the shorted period (YES result at step S5), as shown in FIG. 4 the signal SN switches level, in response to the switching of the signal level of the signal SP1 output from the comparator COM1. In this case, the timing of the switching of the signal level of the signal SN is slightly retarded with respect to the timing of the switching of the signal level of the signal SP1 of the comparator COM1, because of the delay time of the AND circuits 21 and 22.

In this type of case, when the signal SN is supplied, via the AND circuit 23, to the gates of the N-channel FETs N1 and N2, because both the P-channel FET P1 and both of the N-channel FETs N1 and N2 are placed into the on state, a through current flows from the large-capacitance capacitor 4, thereby reducing the charging efficiency.

In this embodiment, at the time t8, when the 2-kHz clock signal CL2 changes to the high level and a transition is made to the shorted period, the signal SN is supplied to the D-type flip-flop circuit 26.

In the case in which chattering occurs in the P-channel FET P1, the signal level of the signal SA1 switches in response to the on/off switching of the P-channel FET P1 (FIG. 4). Therefore, it will be understood that chattering occurs when the P-channel FET P1 or P2 is turned off state. Consequently, detection of altering of the level of the signal SN from the low degree to high degree indicates that the occurrence of chattering. Therefore, as shown in FIG. 4, at time after t8 the signal level of the signal SN rises to the high level (YES result at step S6).

For this reason, the D-type flip-flop circuit 26 detects the rising of the signal SN and, as shown in FIG. 4, the on-inhibit signal SON1 changes to the low level (step S7).

The result of the above is that at the time of transition to the shorted period, if there is chattering in the P-channel FET P1, the on-inhibit signal SON1 changes to the low level, so that the N-channel FETs N1 and N2 are maintained in the off state (step S8).

As described above, the on-inhibit signal SON1 is always returned to the high level by the edge detection circuit 28 after the end of the shorted period (YES result at step S9), and before the transition to the next shorted period. The result is that the on-inhibit signal SON1, as shown in FIG. 4, is at the high level at the time t10 (step S10).

That is, in the case in which chattering occurs in the P-channel FET P1 at the time of transition to the shorted period, by the on-inhibit signal SON1 being at the low level until the transition to the next shorted period, the N-channel FETs N1 and N2 are maintained in the off state, and both the P-channel FETs P1 and N-channel FETs N1 and N2 are kept from going into the on state.

By doing this, it is possible to prevent flow of a through current from the large-capacitance capacitor 4.

Because the on-inhibit signal SON1 always being made high before the transition to the next shorted period, it is possible to supply the signal SN to the gates of the N-channel FETs N1 and N2 before transition to the next shorted period.

Therefore, at the time t11, when the charging (open) time ends (YES result at step S11), when the 2-kHz clock CL2 changes to the high level and transition is made to the next shorted period, as shown in FIG. 4 the signal SN1 changes to the high level, and the N-channel FETs N1 and N2 are switched to the on state.

By doing this, a closed loop is formed by the alternating current generator AG and the N-channel FETs N1 and N2, so that in response to electrical power of the alternating current AG energy is stored in the inductance of the generator coil 37. As a result, the charging of the large-capacitance capacitor 4 begins.

By doing this, in the chopper-type charging circuit 10 according to this embodiment, in the case in which it is decided that both P-channel FETs P1 and P2 are not in the off state during the shorted period, the N-channel FETs N1 and N2 are maintained in the off state, making it possible to prevent flow of a through current from the large-capacitance capacitor 4, thereby improving the charging efficiency of the chopper-type charging circuit 10.

Figure 5:
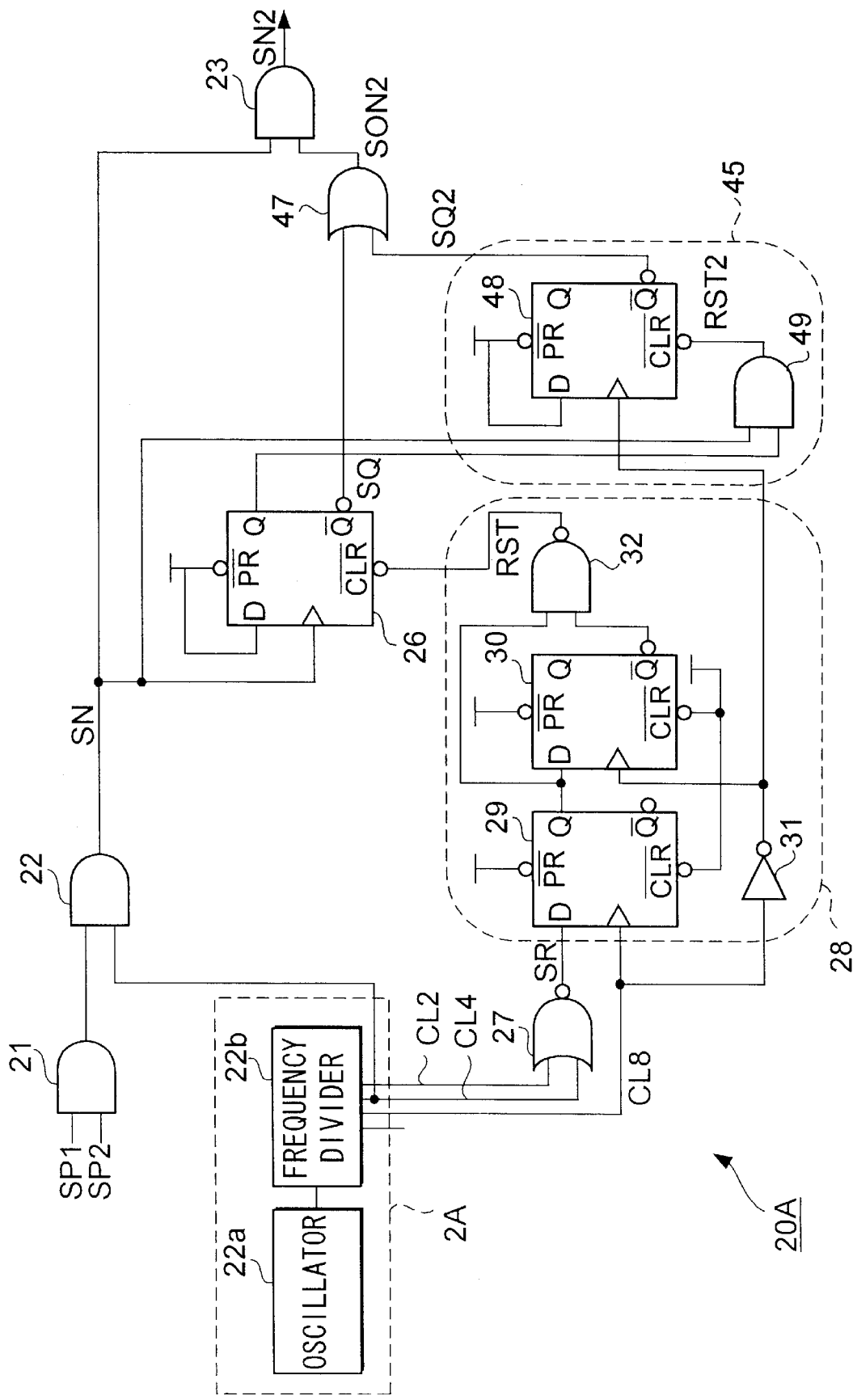
FIG. 5 is a circuit diagram showing the through current prevention circuit and peripheral circuitry of a chopper-type charging circuit used in a wristwatch according to a second embodiment of the present invention.

A second embodiment of the present invention is described in detail below, making reference to FIG. 5, which is a circuit diagram of a chopper-type charging circuit a through current prevention circuit 20A and the surrounding configuration elements for a chopper-type charging circuit used in a wristwatch according to the second embodiment. This through current prevention current 20A, with the exception of the disposing of a charging end detection circuit 45, and an OR circuit 47 between the D-type flip-flop circuit 26 and the AND circuit 23 shown in FIG. 2, the configuration is the same as the chopper-type charging circuit 10 according to the first embodiment. Accordingly, corresponding elements in this embodiment have been assigned the same reference numerals, and will not be explicitly described herein.

In the through current prevention circuit 20A, the charging end detection circuit 45 is formed by a D-type flip-flop circuit 48 and a AND circuit 49.

The clock input terminal of the D-type flip-flop circuit 48 is supplied with a signal output from the inverter 31 of the edge detection circuit 28, that is, with an inverted version of the 8-kHz clock signal CL8. The D-type flip-flop circuit 48 latches the high-level signal supplied to the D input terminal thereof when this signal rises, a high level being output at the Q output terminal of the D-type flip-flop circuit 48.

The signal at the inverted Q output terminal of the D-type flip-flop circuit 48 is supplied as the signal SQ2 to one input of the OR circuit 47.

The AND circuit 49 calculates the logical product of the signal at the Q output terminal of the D-type flip-flop circuit 26 and the signal SN supplied to the AND circuit 49. The output signal RST2 of the AND circuit 49 is supplied to the clear terminal CLR of the D-type flip-flop circuit 48. For this reason, when the signal RST2 changes to the low level, the D-type flip-flop circuit 48 is cleared.

The OR circuit 47 calculates the logical sum of the output signal SQ2 of the charging end detection circuit 45 and the signal SQ. The output signal of the OR circuit 47 is supplied as the on-inhibit signal SON2 to the other input of the AND circuit 23.

Figure 17:
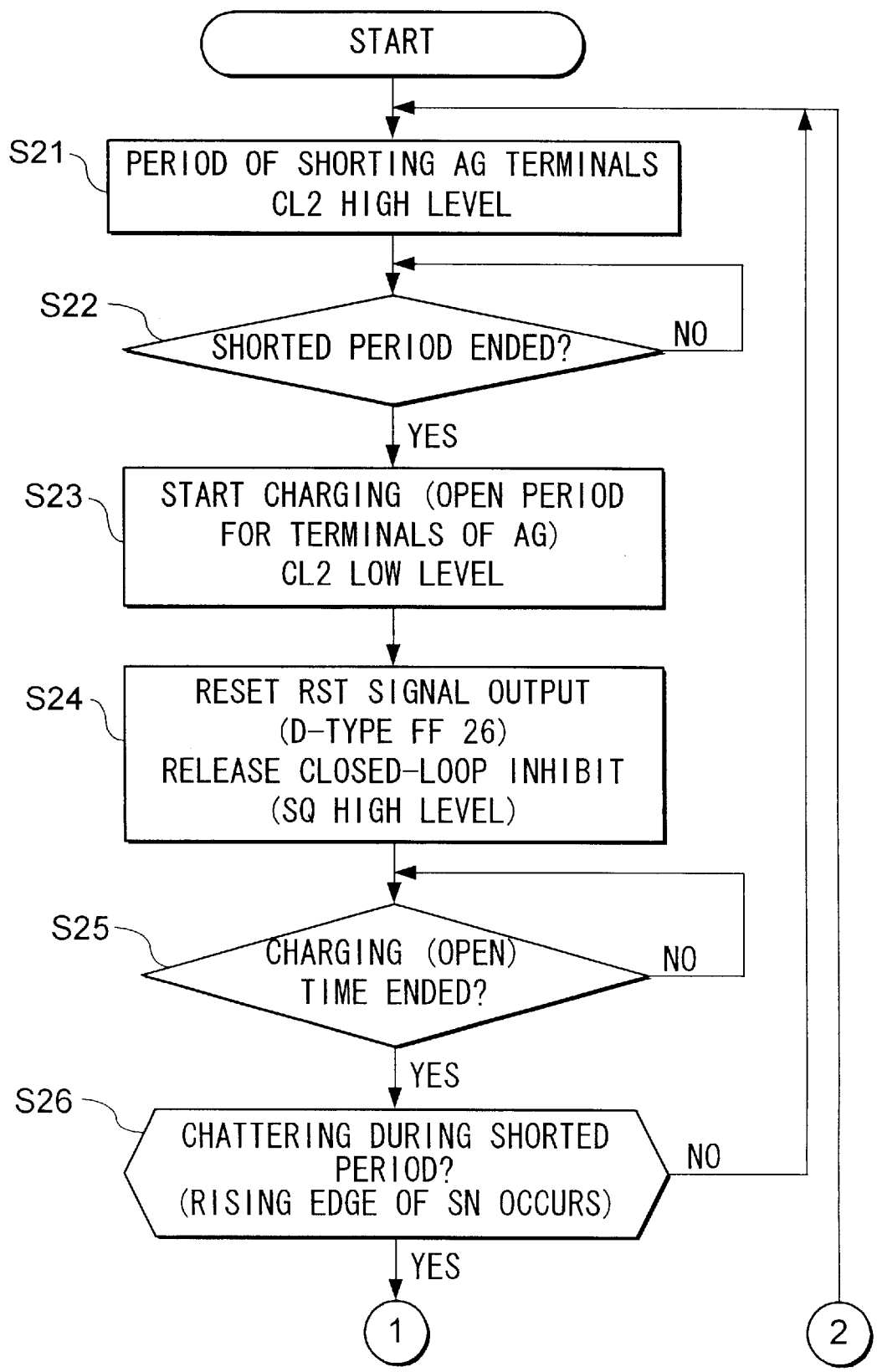
FIGS. 17 and 18 form a flowchart showing an example of operation of a chopper-type charging circuit used in a wristwatch according to the second embodiment of the present invention.
Figure 18:
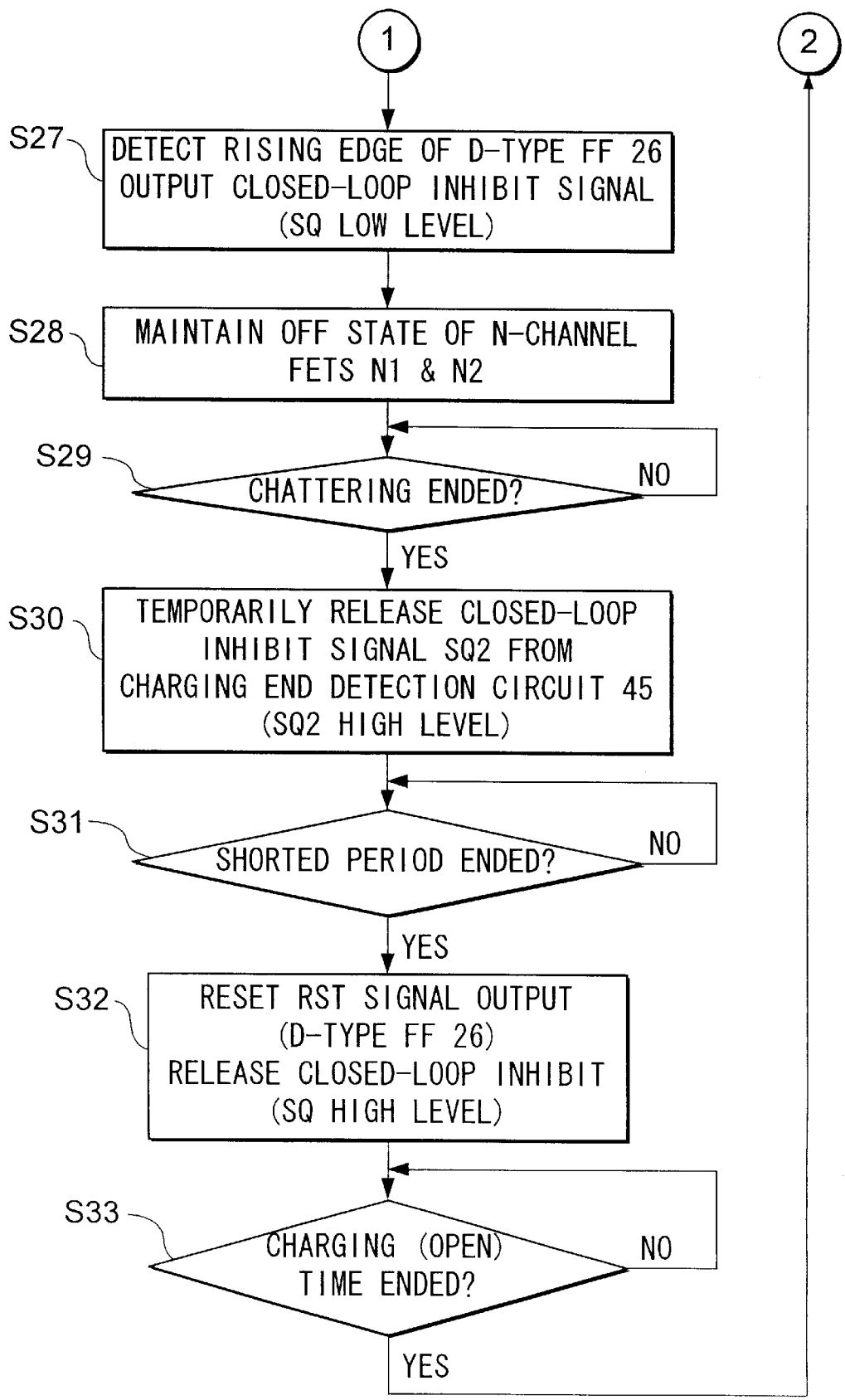

The operation of the second embodiment is described below, with reference being made to the flowchart of FIG. 17 and FIG. 18, and the timing diagram of FIG. 6. In this case, the wristwatch of this embodiment is worn on the wrist, and electromotive force is intermittently generated by the alternating current generator AG.

Figure 6:
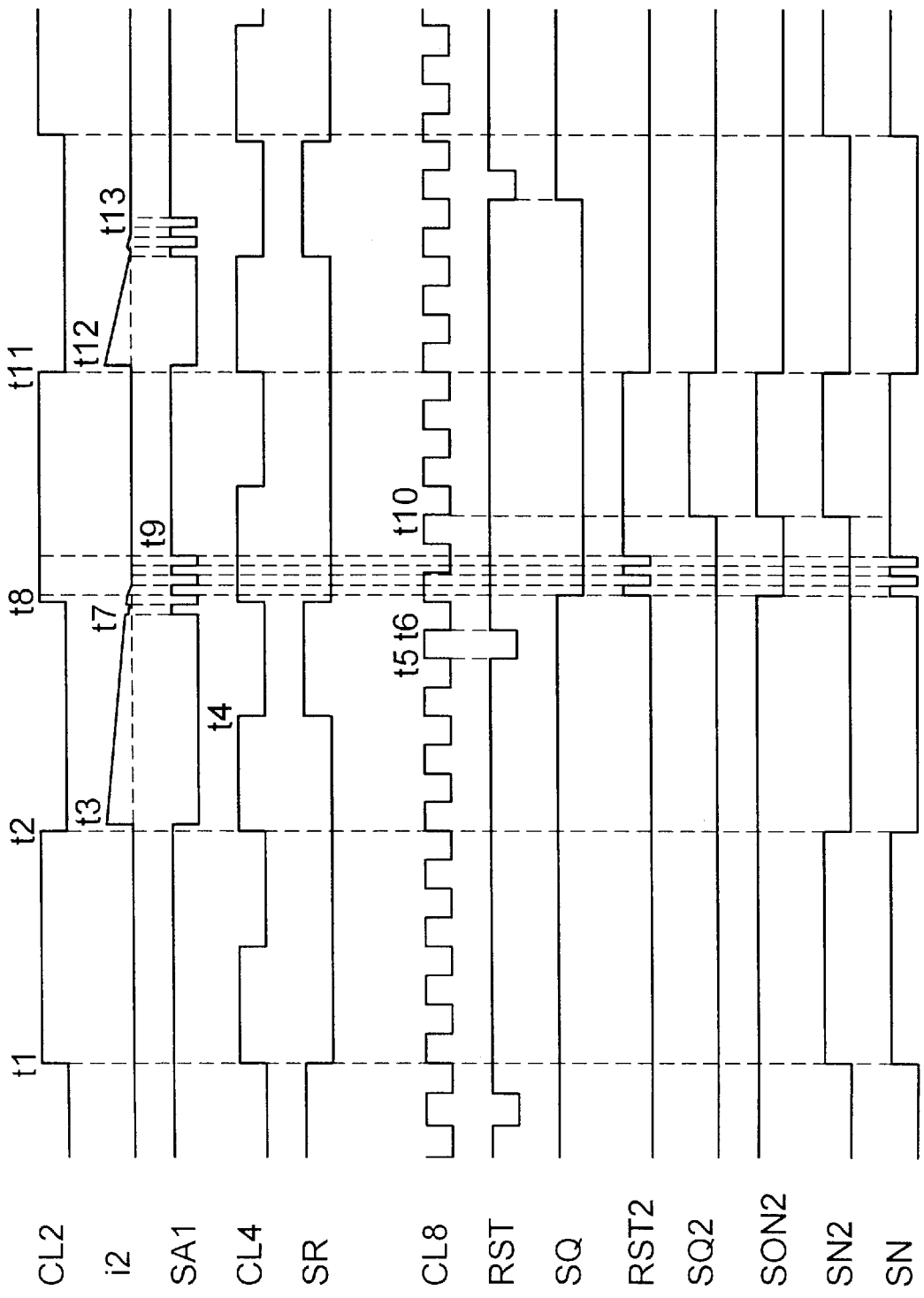
FIG. 6 is a timing diagram of the chopper-type charging circuit of FIG. 5.

FIG. 6 is a timing diagram of the chopper-type charging circuit according to this embodiment. In this case, the assumption is that at the time t1, the output signal SP1 of the comparator COM1 and the output signal SP2 of the comparator COM2 are at the high level, and that the P-channel FETs P1 and P2 are in the off state, that is, the input terminals A and B of the alternating current generator AG are at voltages that are below the terminal voltage VDD.

Because the through current prevention circuit 20A, as described above, with the exception of the disposing of a charging end detection circuit 45, and an OR circuit 47 between the D-type flip-flop circuit 26 and the AND circuit 23, the configuration is the same as the through current prevention circuit 20 according to the first embodiment. Accordingly, corresponding elements in this embodiment have been assigned the same reference numerals, and will not be explicitly described herein.

As shown in FIG. 6, at time t1 the 2-kHz clock signal CL2 output from the frequency division circuit 22b changes to the high level, resulting in a transition from the charging (open) time to the shorted period (step S21). Then, as shown in FIG. 6, the output signal SN of the AND circuit 22 changes to the high level, At this time, as shown in FIG. 6, because the signal SQ is at the high level, as shown in FIG. 6 the on-inhibit signal SON2 is at the high level. For this reason, the signal SN is supplied as the signal SN2, via the AND circuit 23, to the gates of the N-channel FETs N1 and N2.

By the above, as shown in FIG. 6, at time t1 the signal SN2 changes to the high level, and the N-channel FETs N1 and N2 are switched to the on state.

As a result, as shown by the symbol α in FIG. 1, a closed loop is formed by the alternating current generator AG and the N-channel FETs N1 and N2 in the chopper-type charging circuit 10. A current i1 responsive to the electromotive force of the alternating current generator AG flows in this closed loop, resulting in storage of energy in the inductance of the generator coil 37.

At this time, as shown in FIG. 6, because the signal RST2 is held at the low level, the D-type flip-flop circuit 48 is cleared. As shown in FIG. 6, the output signal SQ2 of the charging end detection circuit 45 is maintained at the low level.

Next, as shown in FIG. 6, at time t2 when the 2-kHz clock signal CL2 falls to the low level, the shorted period ends. Then, as shown in FIG. 6, the signal SN changes to the low level. For this reason, as shown in FIG. 6, the signal SN2 changes to the low level, and the N-channel FETs N1 and N2 are switched to the off state.

When the transition from the shorted period to the charging (open) time occurs (YES result at step S22), the voltage at the output terminal A rises as a result of the energy stored in the inductance of the generator coil 37. At time t3, when the voltage at the output terminal A reaches the terminal voltage VDD, the output signal SP1 of the comparator COM1 changes to the low level, and the P-channel FET P1 is placed in the on state.

As a result, a current path to the large-capacitance capacitor 4 is formed. That is, as shown by the symbol β in FIG. 1, a charging current i2 flows in the large-capacitance capacitor 4, so that charging begins (step S23).

While the description above is for the case in which the voltage at terminal A rises, because the operation of the comparator COM1 and the P-channel FET P1 would be the same in the case in which the voltage at the terminal B rises as the operation of the comparator COM2 and the P-channel FET P2 in the described case, this will not be explicitly described. Additionally, because the operation from time t4 to time t9 is the same as in the first embodiment, it will not be described herein.

Next, as shown in FIG. 6, at time t4 the 4-kHz clock signal CL4 changes to the low level, resulting, as shown in FIG. 6, the signal SR changing to the high level.

In this case, the edge detection circuit 28 detects that the 8-kHz clock signal CL8 rises at time t5 and, as shown in FIG. 6, the output signal RST of the edge detection circuit 28 changes to the low level. At time t6, when the 8-kHz clock signal CL8 falls, the signal RST again changes to the high level.

In this manner, when the signal RST changes to the low level, the D-type flip-flop circuit 26 is cleared, and the signal SQ changes to the high level (step S24).

In this case, the D-type flip-flop circuit 26 is cleared at time t5. As shown in FIG. 6, because the signal SQ is already at the high level at time t5, it is maintained at the high level.

The potential of the output terminal A gradually decreases as a result of charging and, at time t7 when the voltage of the output terminal A falls below the voltage VDD, as described above, because there is chattering in the P-channel FET P1, the signal level of the signal SA1 frequently switches between the high level and the low level (the time period from t7 to time t9 in FIG. 6).

For this reason, at time t8, when the 2-kHz clock signal CL2 changes to the high level and a transition occurs from the charging (open) time to the shorted period (YES result at step S25), as shown in FIG. 6 the signal SN, in response to switching of the signal level of the signal SP1 output from the comparator COM1, switches its signal level.

At time t8, when the 2-kHz clock signal CL2 changes to the high level and there is a transition from the charging (open) time to the shorted period, chattering occurs (YES result at step S26), and the signal SN changes to the high level. Therefore, as shown in FIG. 6, the signal SQ changes to the low level (step S27).

When the signal SQ is at the low level, because the Q output terminal of the D-type flip-flop circuit 26 is at the high level, as shown in FIG. 6 the output signal RST2 of the AND circuit 49 of the charging end detection circuit 45, in response to the switching of the signal SN between the high level and the low level, switches between the high and low levels (the period of time from time t8 to time t9).

In this case, the D-type flip-flop circuit 48 repeats the reset (clear)/set operation. In this case, the chattering frequency is a high frequency (approximately 100 kHz) compared with 8-kHz clock signal CL8. Thus, during the period in which the D-type flip-flop circuit 48 is repeating the reset (clear)/set operations, even if there is a rise of the inverted signal of the 8-kHz clock signal CL8 supplied to the clock input terminal, as shown in FIG. 6 the signal SQ2 is maintained at the low level.

The result of the above is that at time t8 the signal SQ and the signal SQ2 change to the low level. Therefore, as shown in FIG. 6 the on-inhibit signal SON2 changes to the low level, and the N-channel FETs N1 and N2 are maintained in the off state (step S28).

At time t9, when the chattering of the P-channel FET P1 ends (YES result at step S29) and the signal RST2 settles at the high level (FIG. 6), at time t10 the charging end detection circuit 45 detects the fall of the 8-kHz clock signal CL8. Then, as shown in FIG. 6, the signal SQ2 output from the charging end detection circuit 45 changes to the high level (step S30).

The result of the above is that, as shown in FIG. 6, the on-inhibit signal SON2 changes to the high level, and the signal SN is supplied to the gates of the N-channel FETs N1 and N2. In this case, because the signal SN is at the high level at time t10, the N-channel FETs N1 and N2 are controlled so as to be in the on state. A closed loop is formed in the chopper-type charging circuit 10 by the alternating current generator AG and the N-channel FETs N1 and N2. The result of this is that, in response to electromotive force of the alternating current generator AG, a current i1 flows, thereby enabling storage of energy in the inductance of the generator coil 37.

As described above, after the end of the shorted period (YES result at step S31), the signal SQ is returned to the high level by the edge detection circuit 28 before transition to the next shorted period (step S32).

That is, in this embodiment in the case in which there is chattering in the P-channel FETs P1 and P2 when the transition to the shorted period occurs, until the charging end detection circuit 45 detects the end of the chattering, the on-inhibit signal SON2 is held at the low level, and the N-channel FETs N1 and N2 are maintained in the off state.

By doing this, it is possible to prevent the situation in which the P-channel FET P1 or P2 and the N-channel FETs N1 and N2 are in the on state, which enables prevention of a through current flowing from the large-capacitance capacitor 4.

In the case in which the charging end detection circuit 45 detects that the chattering has ended, by setting the on-inhibit signal SON2 to the high level, it is possible to supply the signal SN to the gates of the N-channel FETs N1 and N2 immediately after the end of chattering.

In the case of the shorted period, it is possible to set the N-channel FETs N1 and N2 to the on state immediately after the end of chattering, thereby enabling storage of energy in the inductance of the generator coil 37 in response to electromotive force of the alternating current generator AG.

Therefore, at time t11 when the shorted period ends and the N-channel FETs N1 and N2 go into the off state, the energy stored in the inductance of the generator coil 37 causes the voltage on the output terminal A to rise, so that the large-capacitance capacitor 4 is charged (period of time from t12 to t13).

In the chopper-type charging circuit 10 of this embodiment, in the case in which a decision is made that the P-channel FETs P1 and P2 are not in the off state at the time of transition to the shorted period, because the N-channel FETs N1 and N2 are maintained in the off state until the end of chattering, the case in which a through current flows from the large-capacitance capacitor 4 is prevented, thereby improving the charging efficiency of the chopper-type charging circuit 10.

In the chopper-type charging circuit 10 of this embodiment, because it is possible to switch the N-channel FETs N1 and N2 to the on state immediately after the end of chattering, it is possible to achieve an improvement in charging efficiency in comparison with the first embodiment.

A third embodiment of the present invention is described below, with reference to FIG. 7, which is a circuit diagram of a through current prevention circuit of a chopper-type charging circuit used in a wristwatch according to the third embodiment. With the exception of the through current prevention circuit 20B used in place of the through current prevention circuit 20 shown in FIG. 1, this embodiment is the same as the chopper-type charging circuit of the first embodiment. Accordingly, corresponding elements in this embodiment have been assigned the same reference numerals and are not explicitly described herein.

Figure 7:
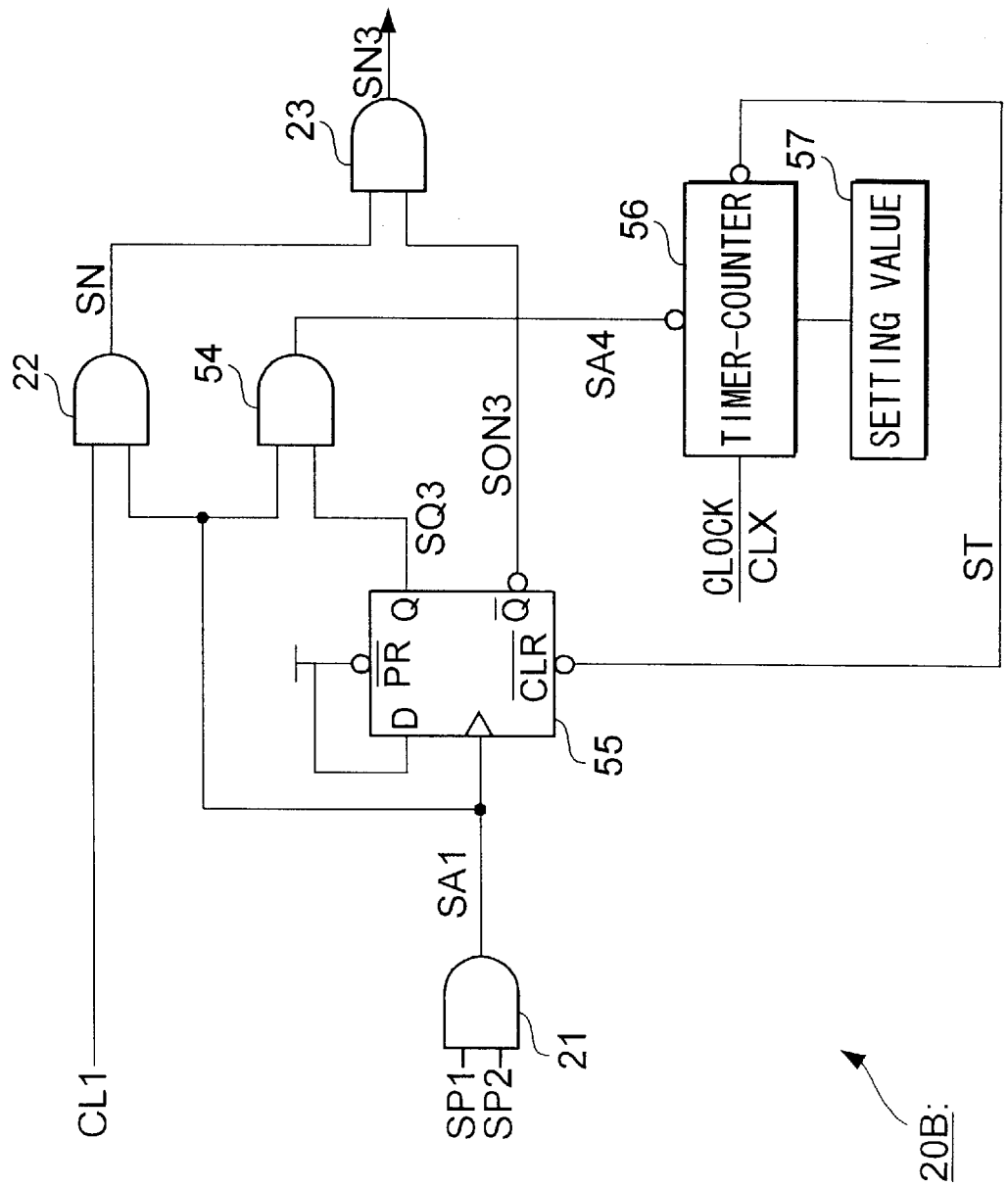
FIG. 7 is a circuit diagram showing the through current prevention circuit of a chopper-type charging circuit used in a wristwatch according to a third embodiment of the present invention.

In FIG. 7, the oscillator circuit 2A has a similar configuration to the oscillator circuit 2A of the first embodiment, and in this case, a 2-kHz clock signal CL1 and a clock signal CLX, which has a frequency higher than the clock signal CL1, for example, 32 kHz, supplied to the through current prevention circuit 20B. The clock signal CLX is supplied to an input terminal of the timer-counter 56.

The through current prevention circuit 20B is formed by the four AND circuits 21, 22, 23, and 54, and a D-type flip-flop circuit 55, and a timer-counter 56.

When the signal SA1 supplied to the clock input terminal of the D-type flip-flop circuit 55 rises, the D-type flip-flop circuit latches the high-level signal supplied to the D input thereof, so that the Q output terminal outputs a high level and the inverted Q output terminal outputs a low level. The D-type flip-flop circuit 55 is cleared when the signal ST supplied to the clear terminal CLR thereof changes to the low level.

The signal at the inverted Q output terminal of the D-type flip-flop circuit 55 is supplied as an on-inhibit signal SON3 to one input terminal of the AND circuit 23.

The signal of the Q output terminal of the D-type flip-flop circuit 55 is supplied as a signal SQ3 to one input terminal of the AND circuit 54.

In this case, the signal SQ3 functions as a signal that opens and closes the AND circuit 54. When the signal SQ3 is at the high level, the signal SA1 becomes the signal SA4 via the AND circuit 54, this signal SA4 being supplied to the set/reset terminal of the timer-counter 56.

Therefore, when the P-channel FETs P1 and P2 are both in the off state, the D-type flip-flop circuit 55 sets the on-inhibit signal SON3 to the low level, and sets the signal SQ3 to the high level. By doing this, the signal SA1 is supplied, via the AND circuit 54, to the set/reset terminal of the timer-counter 56.

When the signal SA4 supplied to the set/reset terminal of the timer-counter 56 changes to the high level, the clock signal CLX supplied to the input terminal thereof is counted. Then, when the signal SA4 changes to the low level, this count value is reset.

When the count value of the timer-counter 56 reaches a set value held in a register 57, a carry signal ST output from the output terminal is caused to fall to the low level, and the count value is reset.

Therefore, after the P-channel FETs P1 and P2 are both set to the off state, the timer-counter 56 counts the signal SA1 supplied thereto via the AND circuit 54, and when the high level state continues for a given amount of time, the carry signal ST is dropped to the low level for a short amount of time.

In this case, because the signal SA1 changes to the high level when both of the P-channel FETs P1 and P2 are in the off state, the timer-counter 56 counts during the period of time over which the P-channel FETs P1 and P2 are in the off state.

Figure 19:
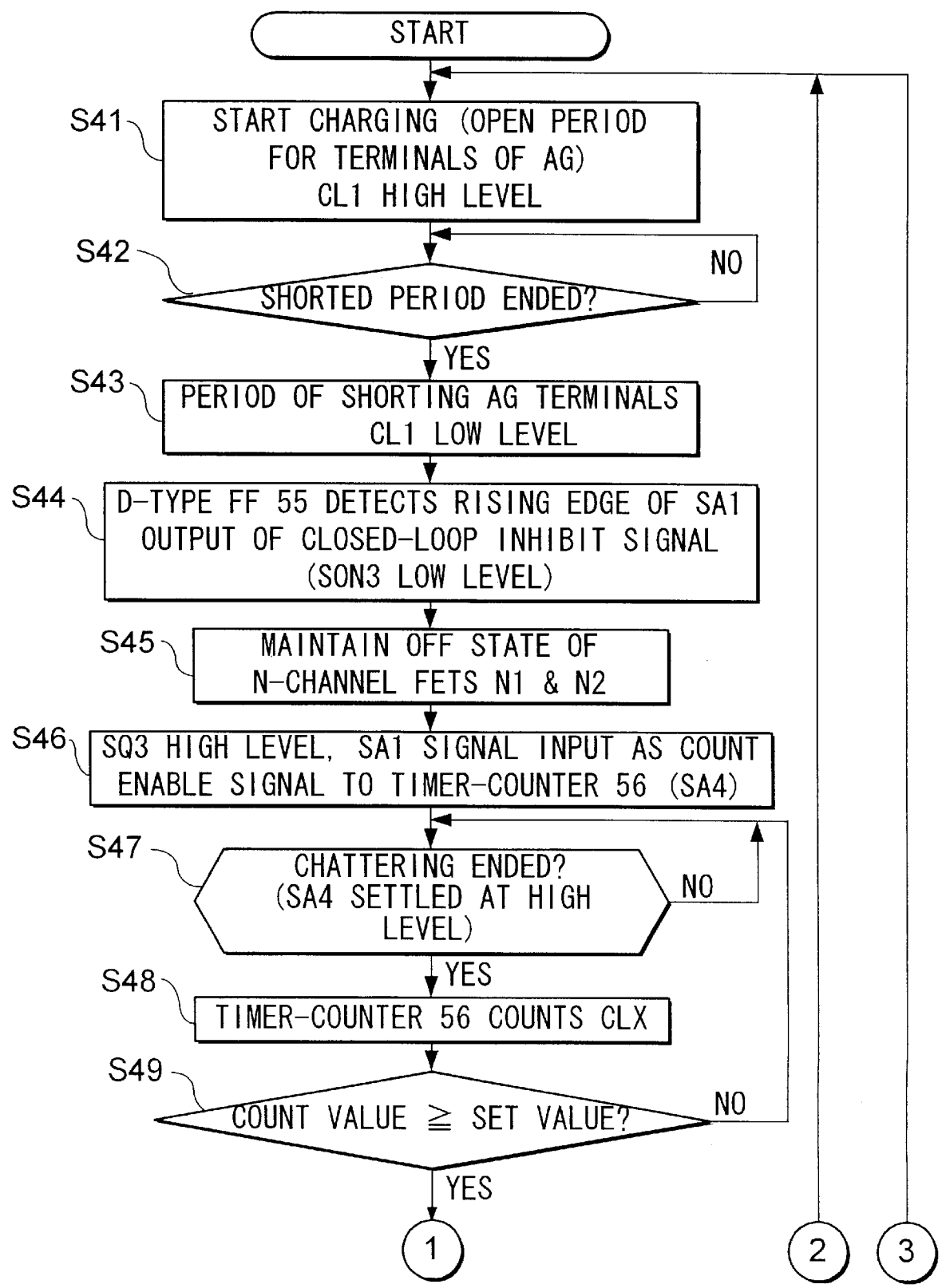
FIGS. 19 and 20 form a flowchart showing an example of operation of a chopper-type charging circuit used in a wristwatch according to the third embodiment of the present invention.
Figure 20:
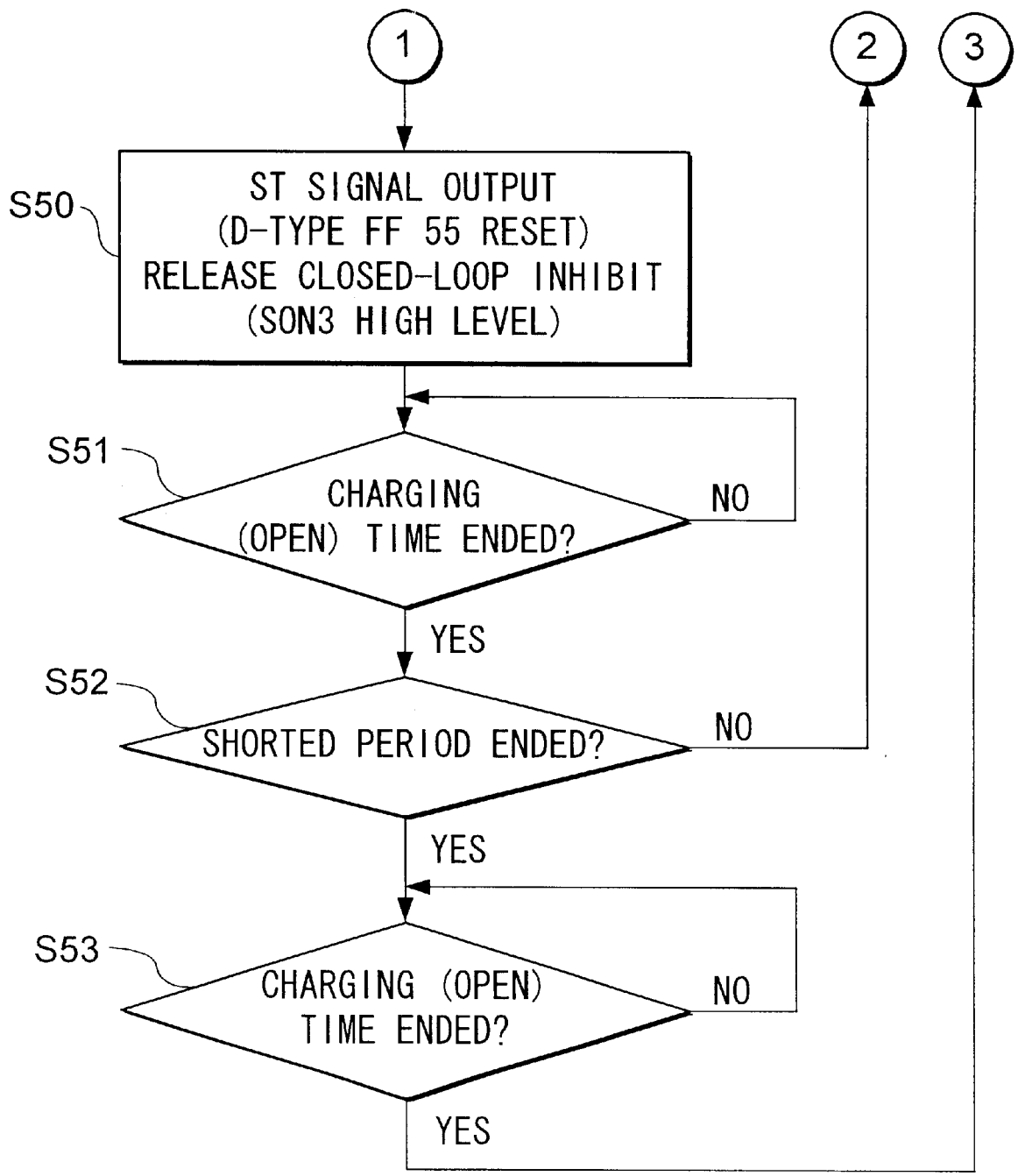

The operation of the third embodiment is described below, with reference being made to the flowchart of FIGS. 19 and 20, and the timing diagram of FIG. 8. In this case, the wristwatch of this embodiment is worn on the wrist, and electromotive force is intermittently generated by the alternating current generator AG.

Figure 8:
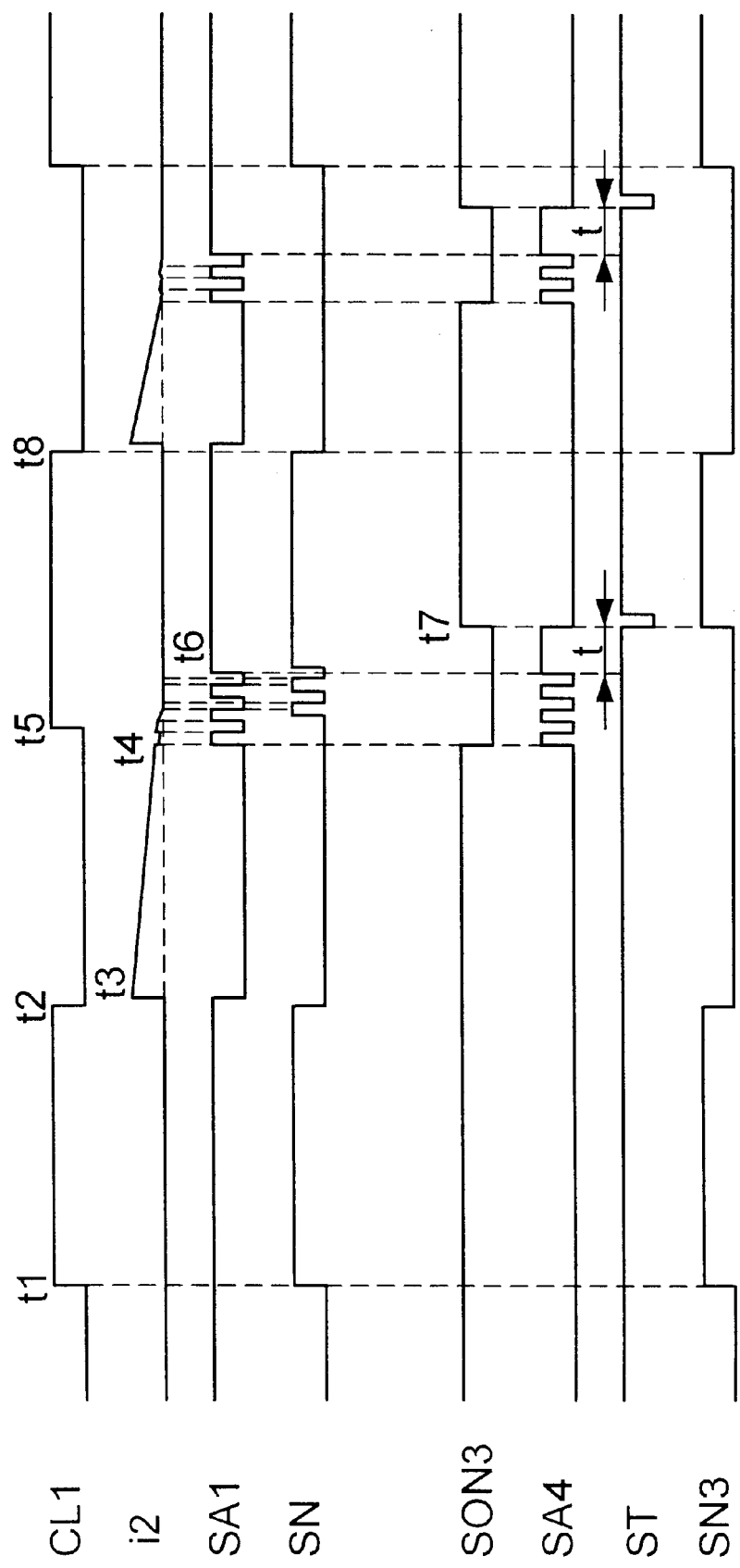
FIG. 8 is a timing diagram of a chopper-type charging circuit of FIG. 7.

FIG. 8 is a timing diagram of the chopper-type charging circuit according to this embodiment. In this case, the assumption is that at the time t1, the output signal SP1 of the comparator COM1 and the output signal SP2 of the comparator COM2 are at the high level, and that the P-channel FETs P1 and P2 are in the off state, that is, the input terminals A and B of the alternating current generator AG are at voltages that are below the terminal voltage VDD. In the time t1, the D-type flip-flop circuit 55 is reset (cleared) by the signal ST supplied to the clear terminal CLR thereof.

As shown in FIG. 8, at the time t1, when the 2-kHz clock signal CL1 output from the oscillator circuit 2A rises to the high level and transition is made to the shorted period (step S41), the signal SN changes to the high level, as shown in FIG. 8.

When this occurs, as shown in FIG. 8 because the on-inhibit signal SON3 is at the high level, the signal SN is supplied as the signal SN3, via the AND circuit 23, to the gates of the N-channel FETs N1 and N2.

The result of the above is that, as shown in FIG. 8, the signal SN3 changes to the high level, and the N-channel FETs N1 and N2 are placed in the on state.

As a result, as shown by the symbol α of FIG. 1, a closed loop is formed by the alternating current generator AC and the N-channel FETs N1 and N2 in the chopper-type charging circuit 10. A current i1 responsive to the electromotive force of the alternating current generator AG flows in this closed loop, resulting in storage of energy in the inductance of the generator coil 37.

At this time, as shown in FIG. 8, because the signal SA4 is at the low level, the count value of the timer-counter 56 is maintained in the reset condition. As shown in FIG. 8, the carry signal ST is maintained at the high level.

Next, as shown in FIG. 8, at time t2 when the 2-kHz clock signal CL1 falls to the low level, and the shorted period end. Therefore, as shown in FIG. 8, the signal SN changes to the low level. The result is that, as shown in FIG. 8, the signal SN3 changes to the low level, and the N-channel FETs N1 and N2 are switched to the off state.

Specifically, at the transition from the shorted period to the charging (open) time (YES result at step S42), the energy stored in the inductance of the generator coil 37 causes the voltage at the output terminal A, for example, to rise. At time t3, when the voltage on the output terminal A reaches the voltage VDD, the output signal SP1 of the comparator COM1 changes to the low level, and the P-channel FET P1 goes into the on state.

As a result, a current path to the large-capacitance capacitor 4 is formed. That is, as shown by the symbol β of FIG. 1, a charging current i2 flows in the large-capacitance capacitor 4, so that charging begins (step S43).

The potential of the output terminal A gradually decreases as a result of charging and, at time t4 when the voltage of the output terminal A falls below the voltage VDD, as described above, because there is chattering in the P-channel FET P1, the signal level of the signal SA1 frequently switches between the high level and the low level (the time period from t4 to time t6), as shown in FIG. 8.

In this case, when the signal SA1 change to the high level at time t4 (step S44), as shown in FIG. 8 the on-inhibit signal SON3 changes to the low level, and the N-channel FETs N1 and N2 are placed in the off state (step S45).

When the signal SA1 changes to the high level, because the signal SQ3 changes to the high level, the signal SA1 is supplied, via the AND circuit 54, as the signal SA4 to the set/reset terminal of the timer-counter 56 (step S46).

By the above, as shown in FIG. 8, when the signal SA4 changes to the high level at time t4, the period of time during which the signal SA4 (SA1) is at the high level, that is, the period of time during which the P-channel FETs P1 and P2 are in the off condition, is counted by the timer-counter 56.

In the above case, because the signal SA4 frequently is switched between the high and low levels during the time at which chattering occurs in the P-channel FET P1 (NO result at step S47), the count value is reset immediately. When the chattering ends and the P-channel FETs P1 and P2 settle in the off state, the signal SA4 stabilizes at the high level, and the count value counts up.

Therefore, at time t6 when the signal SA4 settles at the high level (YES result at step S47), the count value counts up (step S48). At time t7 when the count value reaches the set value stored in the register 57 (YES result at step S49), the carry signal ST is set to the low level for a short period of time, as shown in FIG. 8. Thus, when the carry signal ST changes to the low level, the D-type flip-flop circuit 55 is cleared (step S50). The result of this is that, as shown in FIG. 8, the on-inhibit signal SON3 changes to the high level and, as shown in FIG. 8, the signal SA4 changes to the low level, so that the count value of the timer-counter 56 is maintained in the reset condition.

That is, from the time at which the P-channel FETs P1 and P2 go into the off state to the time at which the off state has continued for a given amount of time, the on-inhibit signal SON3 is maintained at the low level, so that during the time over which the P-channel FET P1 or P2 is chattering, the N-channel FETs N1 and N2 are maintained in the off state.

By doing the above, it is possible to prevent the situation in which both P-channel FET P1 or P2 and both of the N-channel FETs N1 and N2 are in the on state, thereby preventing flow of a through current from the large-capacitance capacitor 4.

At time t7 when the on-inhibit signal SON3 changes to the high level, the signal SN is supplied via the AND circuit 23 to gates of the N-channel FETs N1 and N2. This signal SN controls the N-channel FETs N1 and N2.

In this case, because the signal SN is at the high level at time t7, the N-channel FETs N1 and N2 are controlled so as to be in the on state. By doing this, a closed loop is formed by the alternating current generator AG and the N-channel FETs N1 and N2, and energy is stored in the inductance of the generator coil 37, in response to electromotive force of the alternating current generator AG.

At time t8, when the shorted period ends (YES result at step S52) and the signal SN changes to the low level the N-channel FETs N1 and N2 are placed in the off state. The energy stored in the inductance of the generator coil 37 causes the voltage on the output terminal A to rise, and the large-capacitance capacitor 4 is charged.

By the above, in this embodiment from the time at which the P-channel FETs P1 and P2 are switched off until this off state has continued for a given amount of time, the N-channel FETs N1 and N2 are maintained in the off state, thereby preventing the flow of a through current from the large-capacitance capacitor 4. It is possible to control the N-channel FETs N1 and N2 so as to switch on immediately after the off condition continues for the given period of time, thereby enabling an improvement in the charging efficiency of the chopper-type charging circuit.

A number of variations of the above-noted embodiment can be envisioned, these being described below.

First Variation

In the above-described embodiment, although the description is for the case in which, when the large-capacitance capacitor 4 is charged, the N-channel FETs N1 and N2 are controlled so as to be in the off state, the present invention is not restricted in this manner, and it is possible to have the N-channel FETs N1 and N2 in the current path of the large-capacitance capacitor 4 be in the on state.

Figure 9:
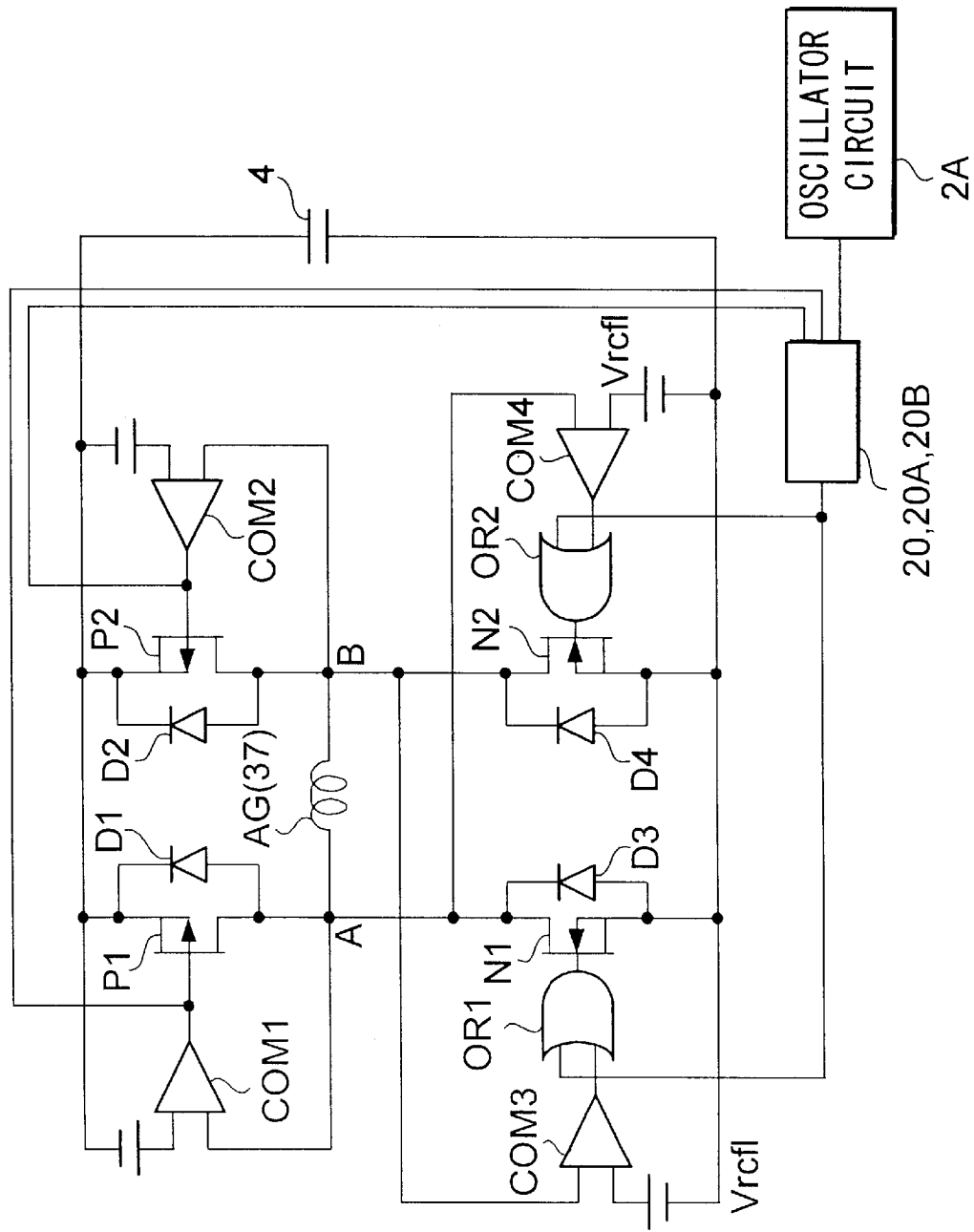
FIG. 9 is a circuit diagram of a chopper-type charging circuit according to a first variation.

In this case, for example as shown in FIG. 9, it is possible to envision a method of adding comparators COM3 and COM4 (second controller) for comparing the voltages at terminals A and B, respectively, of the alternating current generator AG with a reference voltage, and OR circuits OR1 and OR2 (second controller) that calculate the logical sum of the output signal SN1 of the control circuit 20 and the output signals of the comparators COM3 and COM4, respectively, and supplying output signals of the OR circuits OR1 and OR2 to the gates of the N-channel FETs N1 and N2.

Figure 10:
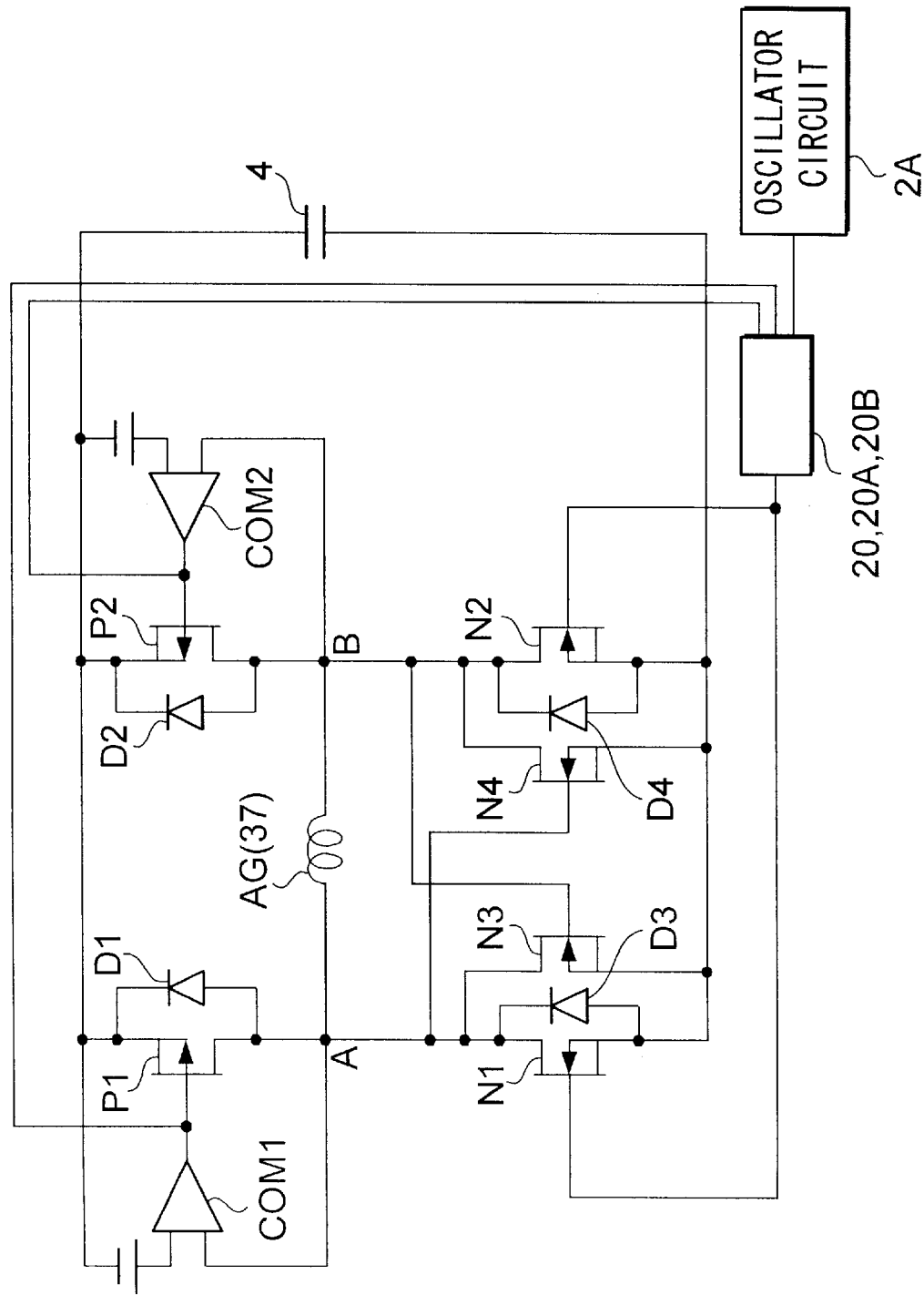
FIG. 10 is a circuit diagram of another exemplified chopper-type charging circuit according to the first variation.

It is possible to envision, as shown in FIG. 10, the parallel connection of N-channel FETs N3 and N4 (second charging switches) to the N-channel FETs N1 and N2, respectively, and the supply of the voltages of the output terminals A and B of the alternating current generator AG to the gates of the N-channel FETs N3 and N4.

If this is done, it is possible to prevent the loss in the diode D3 or D4, in which current flows during charging, thereby enabling an improvement in the charging efficiency of the chopper-type charging circuit.

Second Variation

In the above-described embodiment, while the description is for the case in which the electromotive force of the alternating current generator is charged, the present invention is not restricted in this manner, and it is possible to use alternating current electrical power from a commercial alternating current line, alternating current from a radio signal, or direct current electrical power from a direct current electrical generator or the like for charging.

Figure 11:
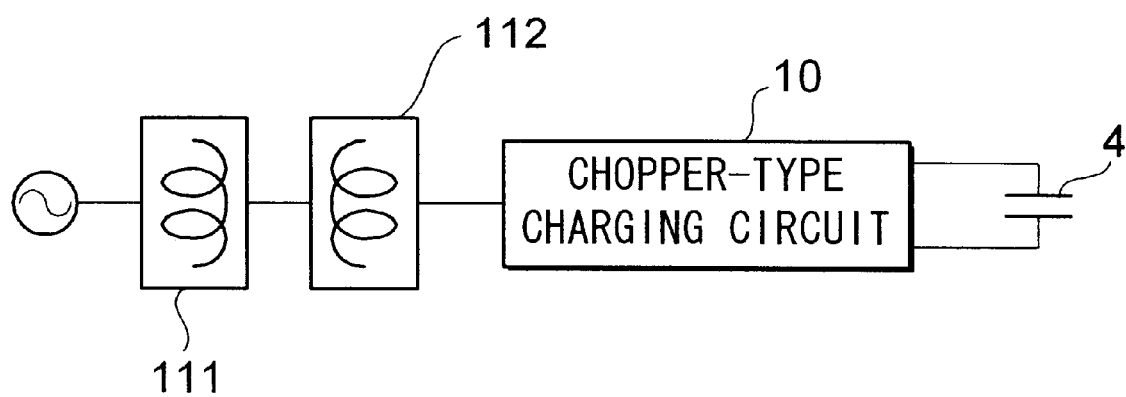
FIG. 11 is a drawing showing a non-contact method of inputting electrical power of an alternating current power source.
Figure 12:
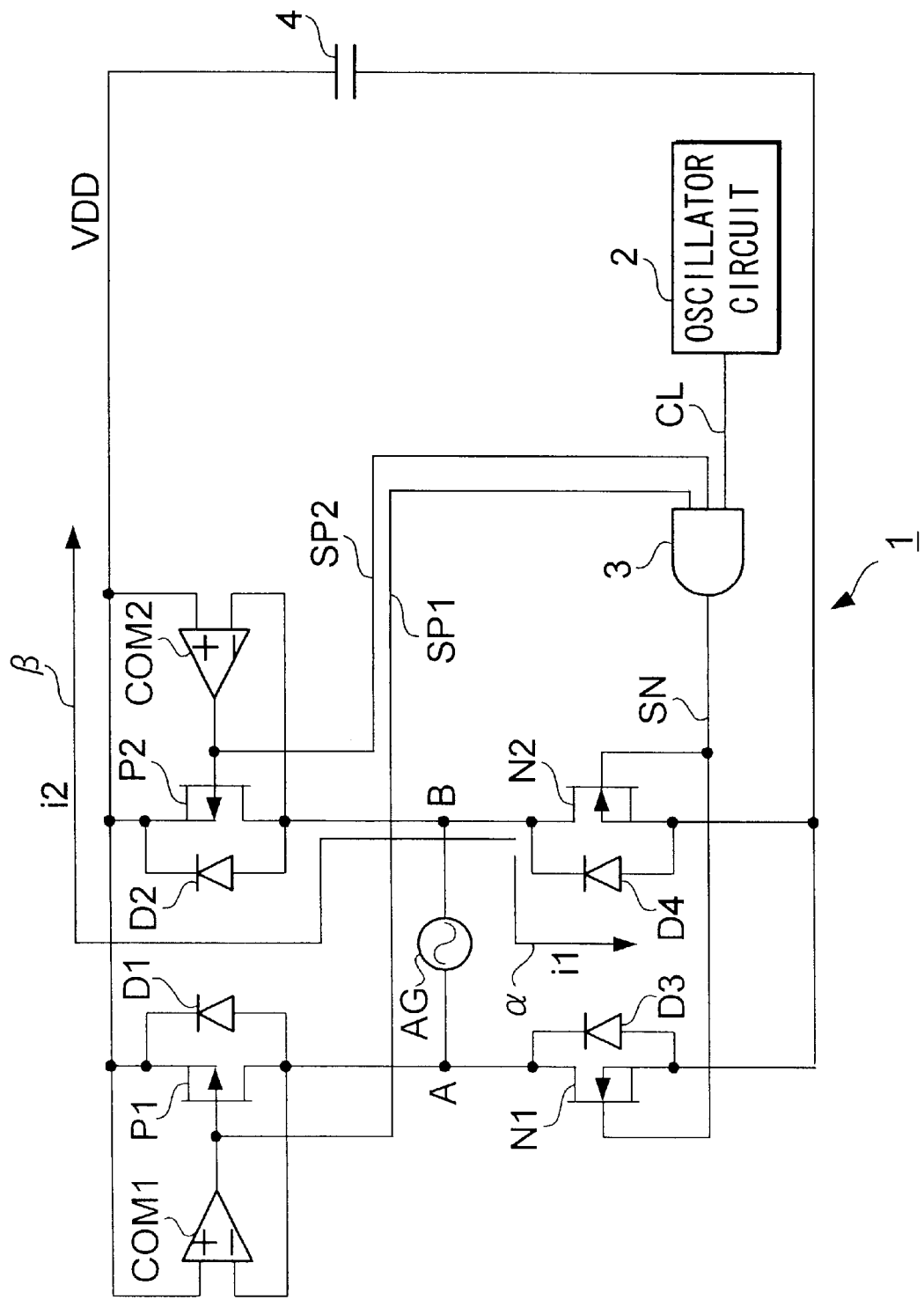
FIG. 12 is a circuit diagram of a chopper-type charging circuit of the past.
Figure 13:
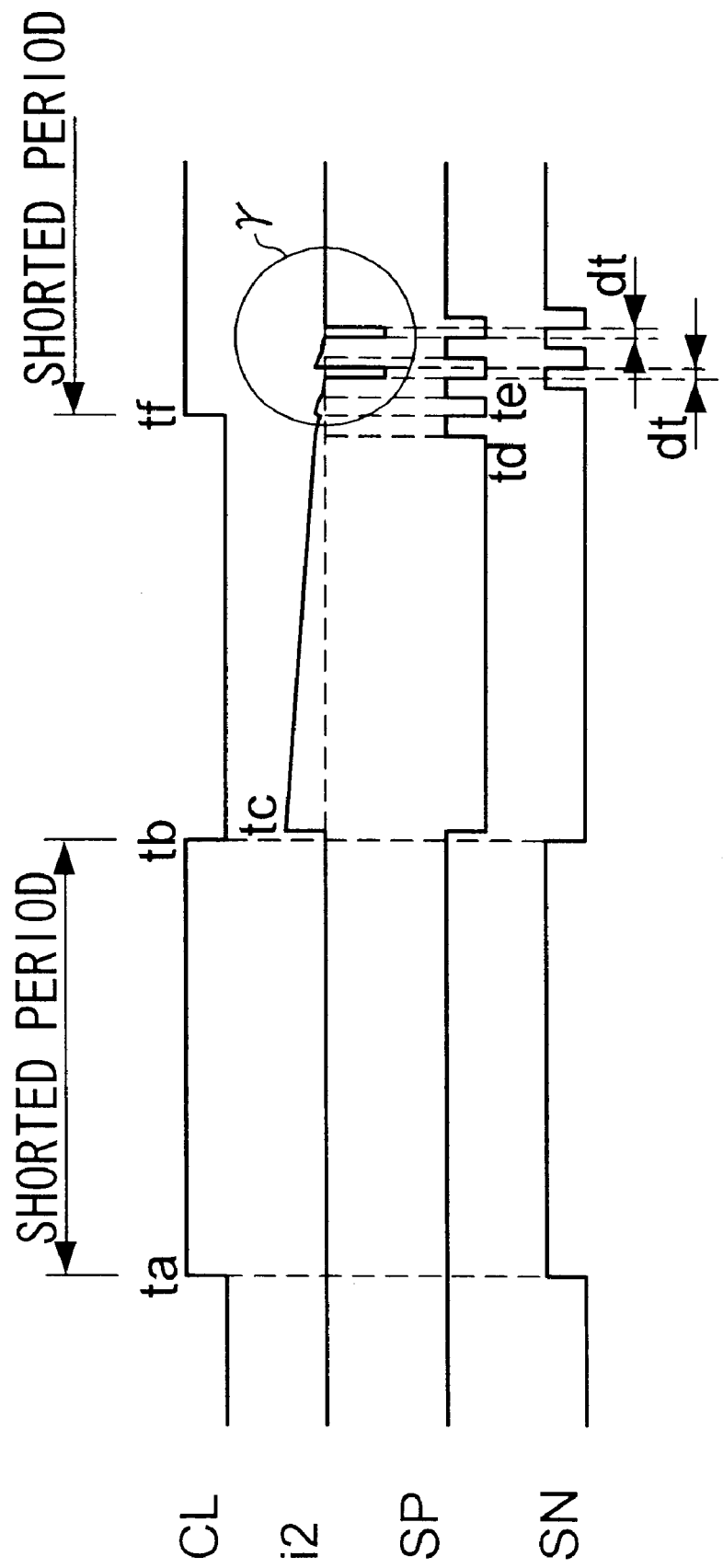
FIG. 13 is a timing diagram of the chopper-type charging circuit of the past shown in FIG. 12.
Figure 14A:
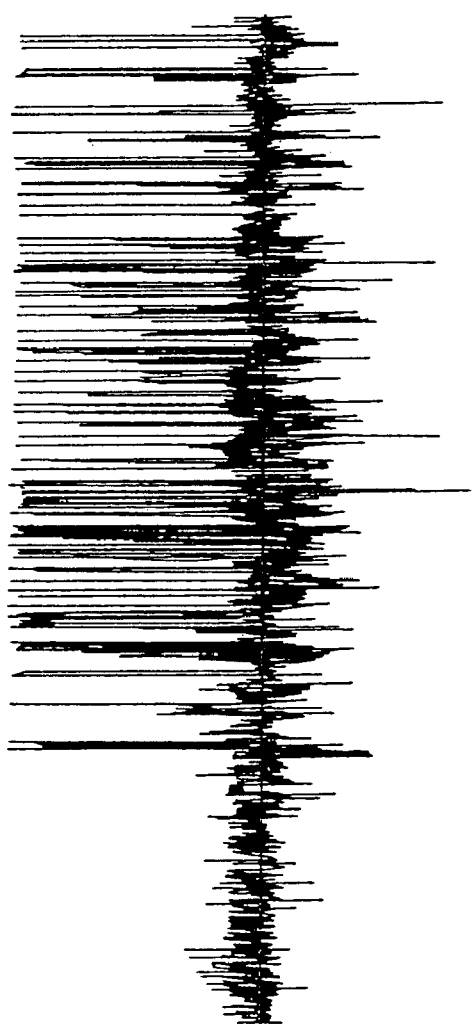
FIGS. 14A and 14B is waveform diagram and enlarged waveform diagram of charging current flowing in the chopper-type charging circuit of FIG. 12.
Figure 14B:
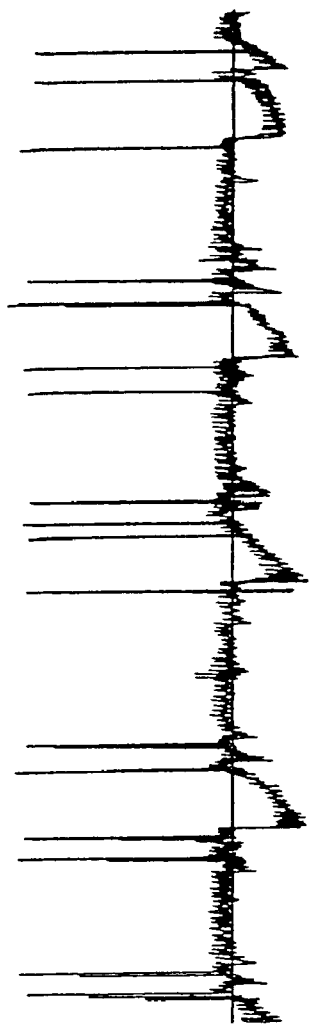

The method of inputting the electrical power includes the non-contact method of using an intervening coils (primary coil 111 (sending side) and secondary coil 112 (receiving side), as shown in FIG. 11.

Third Variation

In the above-described embodiment, while the description is for the example of using P-channel field effect transistors as switching sections, the present invention is not restricted in this manner, and it is alternately possible to use PNP bipolar transistors in place of the P-channel FETs and NPN bipolar transistors in place of the N-channel FETs.

It is further possible to replace the P-channel FET P1 and P2 with diodes, in which case the comparators COM1 and COM2 detect the forward voltages of the diodes, and the respective output signals SP1 and SP2 thereof are supplied to only the controller 20.

Fourth Variation

In above-described embodiment, while the description is for the case in which the present invention is applied to a chopper-type charging circuit in which full-wave rectification is done, the present invention is not restricted in this maimer, and it is possible to apply the present invention to a half-wave rectification chopper as well.

Fifth Variation

In the above-described embodiment, while the description is for the case in which the chopper-type charging circuit is applied to a wristwatch, the present invention is not restricted in this manner, and it is possible to apply the present invention to other types of clocks, to clocks incorporated within electronic equipment such as personal computers, calculators, and mobile telephones, and further to a broad range of electronic devices, such as portable sphygmomanometers, pagers, and walking step counters. It is further possible to provide in these electronic devices both a battery and a chopper-type charging circuit, with operation done on electrical power from the battery when the stored electrical power becomes small.

Sixth Variation

In the above-described embodiment, while the description is for the case in which the present invention is applied to a chopper-type charging circuit, the present invention can also be applied to a chopper circuit which simply outputs a chopper voltage.

In a chopper-type charging circuit of the present invention as described in detail above, in the case in which chattering occurs in the P-channel FETs P1 and P2 for charging, by forcibly setting the N-channel FETs N1 and N2 to the off state for a given amount of time, it is possible to prevent a through current flow, and to improve the charging efficiency.

What is claimed is:

1. A chopper circuit for generating a chopper voltage from electrical power of a power source, this chopper voltage being generated between a first line and a second line, the chopper circuit comprising:
    a comparator for detecting an electromotive force, which compares a voltage of the first line with a voltage of an input terminal to which electrical power of the power source is supplied;
    a switching section for charging provided between the first line and the input terminal, which, in a case in which a comparison result from the comparator is that the voltage of the input terminal is equal to or greater than a prescribed voltage, causes current to flow in one direction;
    a switching section for a closed loop, provided between the second line and the input terminal, comprising a switching element and a unidirectional element connected in parallel with the switching element, which causes current to flow in one direction; and
    a controller controlling the switching element of the switching section,
    wherein the controller comprises:
        a closed-loop controller setting a shorted period based on a clock signal, which, in a case in which the switching section for charging is off during the shorted period, sets the switching section for a closed loop to on until the end of the shorted period, and
        a closed-loop inhibiting controller, which, in a case in which chattering occurs in the switching section for charging, forcibly sets the switching section for the closed loop to the off state for a given amount of time.

2. A chopper circuit according to claim 1, wherein the electrical power of the power source is an electromotive force generated by an electrical generator.

3. A chopper circuit according to claim 1, wherein the closed-loop controller comprises:
    an off controller making a decision that chattering is occurring, based on detecting that the switching section for charging is changed from on to off in the shorted period, which, in the case in which chattering is decided to be occurring, forcibly sets the switching element of the switching section for the closed-loop to off; and
    an off reset section, which, at least before a next shorted period, resets the off state of the switching element of the switching section for the closed loop originally set by the off controller.

4. A chopper circuit according to claim 3, wherein the closed-loop inhibiting section further comprises:
    a charging end determination section for determining the end of charging by detecting that the switching section for charging has been off for a given amount of time,
    wherein when a decision is made by the charging end determination section that charging has ended, the off state of the switching element of the switching section for a closed loop, originally set by the off controller, is reset.

5. A chopper circuit according to claim 1, wherein the closed-loop controller comprises:
    an off controller, which, when it makes a decision that chattering is occurring, based on detecting that the switching section for charging is changed from on to off, forcibly sets the switching element of the switching section for a closed loop to off; and
    a charging end detection section, which, when it decides that charging has ended by detecting that the switching section for charging has been off for a given amount of time, releases the off state of the switching element of the switching section for a closed loop that was originally set by the off controller.

6. A chopper circuit according to claim 1, further comprising:
    a second controller, provided between the second line and another input terminal that forms a pair with the input terminal, which, when a voltage of the other input terminal is equal to or greater than a prescribed voltage, sets the switching element of the switching section for a closed loop to on.

7. A chopper circuit according to claim 1, further comprising a second switching section for charging connected in parallel with the switching section for a closed loop,
    wherein the second switching section for charging switches a connection condition in response to a voltage on the other input terminal forming a pair with the input terminal.

8. A chopper circuit according to claim 1, wherein the switching element for charging comprises:
    a switching element controlled based on a comparison result from the comparator for detecting an electromotive force, and a unidirectional element, connected in parallel with the switching element, which causes current to flow in one direction.

9. A chopper circuit according to claim 1, wherein the switching element for charging is a diode.

10. A chopper circuit for generating a chopper voltage from electrical power of an alternating current power source, the chopper voltage being generated between a first line and a second line, the chopper circuit comprising:

a first comparator for comparing a voltage of the first line with a voltage of the one input terminal to which electrical power of the alternating current power source is supplied;

a first switching section, provided between the first line and the one input terminal, which, in a case in which the voltage of the one input terminal is equal to or greater than a prescribed voltage, causes current to flow in one direction;

a second comparator for comparing a voltage of the first line with another input terminal to which electrical power of the alternating current power source is supplied;

a second switching section, provided between the first line and the other input terminal, which, in a case in which the voltage on the other input terminal is equal to or greater than a prescribed voltage, causes current to flow in one direction;

a third switching section, provided between the second line and the one input terminal, having a switching element and a unidirectional element connected in parallel with the switching element, which causes current to flow in one direction;

a fourth switching section, provided between the second line and the other input terminal, having a switching element and a unidirectional element connected in parallel with the switching element, which causes current to flow in one direction; and a controller controlling the switching elements in the third and the fourth switching sections, wherein the controller comprises a closed-loop controller setting a shorted period based on a clock signal, which, in a case in which the first and the second switching sections are off during the shorted period, sets the switching elements of the third and the fourth switching sections to on until the shorted period ends, and a closed-loop inhibiting section, which, in a case in which chattering occurs in the first and the second switching sections, forcibly sets the switching elements of the third and the fourth switching sections to off for a given amount of time.

11. A chopper circuit according to claim 10, wherein electromotive force of the power source is an electromotive force generated by an electrical generator.

12. A chopper circuit according to claim 10, wherein the closed-loop inhibiting section comprises:

an off controller making a decision that chattering is occurring, based on detecting that the switching section for charging is changed from on to off in the shorted period, which, in a case in which chattering is decided to be occurring, forcibly sets the switching elements of the third and the fourth switching sections to off; and an off reset section, which, at least before a next shorted period, resets the off state of the switching elements of the third and the fourth switching sections originally set by the off controller.

13. A chopper circuit according to claim 12, wherein the closed-loop inhibiting section further comprises:

a charging end determination section for determining the end of charging by detecting that the first and the second switching sections have been off for a given amount of time, wherein when a decision is made by the charging end determination section that the charging has ended, the off state of the switching elements of the third and the fourth switching sections, originally set by the off controller, are reset.

14. A chopper circuit according to claim 13, wherein the closed-loop inhibiting section comprises:

an off controller, which, when it makes a decision that chattering is occurring, based on detecting that the first or second switching section is changed from on to off, forcibly sets the switching elements of the third and fourth switching sections to off; and a charging end detection section, which, when it decides that charging has ended by detecting that the first and second switching sections have been off for a given amount of time, releases the off state of the switching elements of the third and the fourth switching sections that was originally set by the off controller.

15. A chopper circuit according to claim 10, wherein the first switching section comprises:

a switching element controlled base on a comparison result of the first comparator, and a unidirectional element, connected in parallel with the switching section, which causes current to flow in one direction, and wherein the second switching section comprises:

a switching element controlled base on a comparison result of the second comparator, and a unidirectional element, connected in parallel with the switching section, which causes current to flow in one direction.

16. A chopper circuit according to claim 10, wherein the first and the second switching sections are diodes.

17. A chopper circuit according to claim 1, wherein the first line is a high-voltage side line and the second line is a low-voltage side line.

18. A chopper circuit according to claim 1, wherein the switching elements are field-effect transistors, and wherein the unidirectional elements are parasitic diodes of the field-effect transistors.

19. A chopper circuit according to claim 10, wherein the first line is a high-voltage side line and the second line is a low-voltage side line.

20. A chopper circuit according to claim 10, wherein the switching elements are field-effect transistors, and wherein the unidirectional elements are parasitic diodes of the field-effect transistors.

21. A method for controlling a chopper circuit including a comparator circuit for detecting an electromotive force, which compares a voltage of a first line with a voltage of an input terminal to which electrical power of a power source is supplied; a switching circuit for charging provided between the first line and the input terminal, which, in a case in which the voltage of the input terminal is equal to or greater than a prescribed voltage, causes current to flow in one direction; a switching circuit for a closed loop, provided between a second line and the input terminal, comprising a switching element and a unidirectional element connected in parallel with the switching element, which causes current to flow in one direction; and a control circuit controlling the switching element of the switching circuit, wherein a chopper voltage is generated from electrical power of the power source, the chopper voltage being generated between the first line and the second line, the method comprising:

setting, by the control circuit, a shorted period based on a clock signal;

deactivating, by the control circuit, the switching element of the switching circuit for the closed loop to the off state until the shorted period ends if the switching circuit for charging is turned off during the shorted period; and deactivating the switching element of the switching circuit for the closed loop into the off state for a given amount of time if chattering occurs in the switching circuit for charging.

22. A method according to claim 21, wherein the electrical power of the power source is an electromotive force generated by an electrical generator.

23. A method according to claim 21, wherein the control circuit when it is decided that chattering occurs by detecting that the switching circuit for charging is changed from on to off in the shorted period, forcibly sets the switching element of the switching circuit for a closed-loop to off, and at least before a next shorted period, releases the off state of the switching element of the switching circuit for a closed loop.

24. A method according to claim 23, wherein the control circuit decides that charging has ended by detecting that the switching circuit for charging has been off for a given amount of time, and when a decision is made that charging has ended, releases the off state of the switching element of the switching circuit for a closed loop.

25. A method according to claim 21, wherein the control circuit when it is decided that chattering occurs by detecting that the switching circuit for charging is changed from on to off, forcibly sets the switching circuit for closed loop to off, and when it is decided that charging has ended, by detection that the switching circuit for charging is off for a given amount of time, releases the off state of the switching circuit for a closed loop.

26. A method for control of a chopper circuit including a first comparator circuit comparing a voltage of a first line with a voltage of one input terminal to which electrical power of an alternating current power source is supplied; a first switching circuit provided between the first line and the one input terminal, which, in a case in which the voltage of the one input terminal is equal to or greater than a prescribed voltage, causes current to flow in one direction; a second comparator circuit comparing a voltage of a first line with a voltage of another input terminal to which electrical power of the alternating current power source is supplied; a second switching circuit provided between the first line and the another input terminal, which, in a case in which the voltage of the another input terminal is equal to or greater than a prescribed voltage, causes current to flow in one direction; a third switching circuit provided between the second line and the one input terminal, having a switching element and a unidirectional element connected in parallel with the switching element, which causes current to flow in one direction; a fourth switching circuit provided between the second line and the another input terminal, having a switching element and a unidirectional element connected in parallel with the switching element, which causes current to flow in one direction; and a control circuit controlling the switching elements of the third and the fourth switching circuits, wherein a chopper voltage is generated from electromotive force of the alternating current power source, the chopper voltage being generated between the first line and the second line, the method comprising:

setting, by the control circuit, a shorted period based on a clock signal;

activating, by the control circuit, the switching elements of the third and the fourth switching circuits to the on state until the shorted period ends if the first and the second switching circuits are turned off during the shorted period; and deactivating forcibly, by the control circuit, the switching elements of the third and fourth switching circuits into the off state if chattering occurs in the first and the second switching circuits.

27. A method according to claim 26, wherein electrical power of the power source is an electromotive force generated by an electrical generator.

28. A method according to claim 26, wherein the control circuit when a decision is made that chattering occurs, by detecting of the switching circuit for charging being changed from on to off in the shorted period, forcibly sets the switching elements of the third and the fourth switching circuits to off, and wherein the control circuit, at least before the next shorted period, releases the off state of the switching elements of the third and the fourth switching circuits.

29. A chopper circuit control method according to claim 26, wherein the control circuit decides that charging has ended by detecting that the first and the second switching circuits have been off for a given amount of time, and when the end of charging is decided, releases the off state of the switching elements of the third and the fourth switching circuits.

30. A chopper circuit control method according to claim 29, wherein the control circuit decides that chattering occurs by detecting that the first or the second switching circuits in changed from on to off;

forcibly sets the switching elements of the third and the fourth switching circuits to off if decision is made that chattering is occurring;

decides that charging has ended by detecting that the first and the second switching circuits are off for a given amount of time; and releases the off state of the switching elements of the third and fourth switching circuits if decision is made that charging has ended.

31. A chopper-type charging circuit comprising a chopper circuit according to claim 1 and a storage section storing a chopper voltage of the chopper circuit.

32. An electronic device internally comprising a chopper-type charging circuit according to claim 31 and operating by electrical power supplied from the chopper-type charging circuit.

33. A timekeeping apparatus comprising a chopper-type charging circuit according to claim 31 and a time display section displaying a time kept by electrical power supplied from the chopper-type charging circuit.

34. A chopper-type charging circuit comprising a chopper circuit according to claim 10 and a storage battery that stores a chopper voltage of the chopper circuit.

35. An electronic device internally comprising a chopper-type charging circuit according to claim 34, which operates by electrical power supplied from the chopper-type charging circuit.

36. A timekeeping apparatus comprising a chopper-type charging circuit according to claim 34 and a timekeeping display which displays time kept by electrical power supplied from the chopper-type charging circuit.

* * * * *

UNITED STATES PATENT AND TRADEMARK OFFICE
CERTIFICATE OF CORRECTION

| | |
|---|---|
| PATENT NO. | : 6,304,474 B1 |
| APPLICATION NO. | : 09/688272 |
| DATED | : October 16, 2001 |
| INVENTOR(S) | : Osamu Shinkawa |

It is certified that error appears in the above-identified patent and that said Letters Patent is hereby corrected as shown below:

On Title Page

Item (30) Foreign Application Priority Data:

Please change "12-267547" to --2000-267547--

Signed and Sealed this

Seventeenth Day of July, 2007

JON W. DUDAS
*Director of the United States Patent and Trademark Office*